United States Patent
Umeno et al.

(10) Patent No.: US 6,591,670 B1
(45) Date of Patent: Jul. 15, 2003

(54) DEVICE FOR DETECTING WHEEL SPEED SIGNAL FREQUENCY

(75) Inventors: Takaji Umeno, Aichi-ken (JP); Katsuhiro Asano, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 210 days.

(21) Appl. No.: 09/666,137

(22) Filed: Sep. 20, 2000

(30) Foreign Application Priority Data

Sep. 21, 1999 (JP) .......................... 11-267116
Oct. 13, 1999 (JP) .......................... 11-290507

(51) Int. Cl.[7] .......................... G01M 17/02
(52) U.S. Cl. .......................... 73/146
(58) Field of Search .......................... 73/146, 146.2, 73/146.3, 146.4, 146.5; 340/442, 443, 444, 445

(56) References Cited

U.S. PATENT DOCUMENTS 3,577,050 A * 5/1971 Ringland et al. ............ 318/146
3,622,208 A * 11/1971 Krugler, Jr. ............. 188/181 C
5,553,491 A * 9/1996 Naito et al. ................ 73/146.5

FOREIGN PATENT DOCUMENTS

| JP | 62-149503 | 7/1987 |
| JP | 5-273265 | 10/1993 |
| JP | 5-319039 | 12/1993 |
| JP | 8-101085 | 4/1996 |
| JP | 8-219920 | 8/1996 |

* cited by examiner

Primary Examiner—William Oen
(74) Attorney, Agent, or Firm—Oblon, Spivak, McClelland, Maier & Neustadt, P.C.

(57) ABSTRACT

A wheel speed is detected by a wheel speed detecting device, and a wheel speed signal is outputted to a reference value setting device. At the reference value setting device, the wheel speed signal is corrected such that a center of an amplitude of the wheel speed signal becomes a zero reference, and the wheel speed signal is amplified by carrying out a predetermined processing. Further, a selecting device selects, of the wheel speed signals during a predetermined period of time, wheel speed signals whose S/N ratios are poor, which are not to be used. A frequency detecting device judges a tire air pressure state by an air pressure state judging device from a number of times an amplified wheel speed signal crosses the zero reference (a number of times a sign changes).

19 Claims, 16 Drawing Sheets

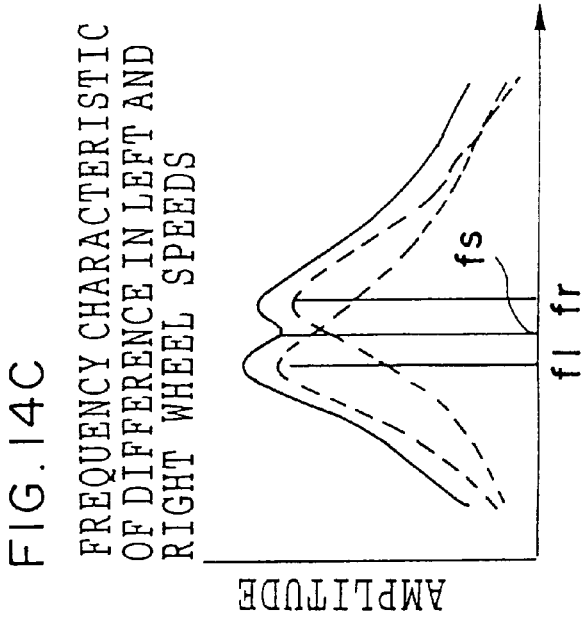
FIG.14C FREQUENCY CHARACTERISTIC OF DIFFERENCE IN LEFT AND RIGHT WHEEL SPEEDS
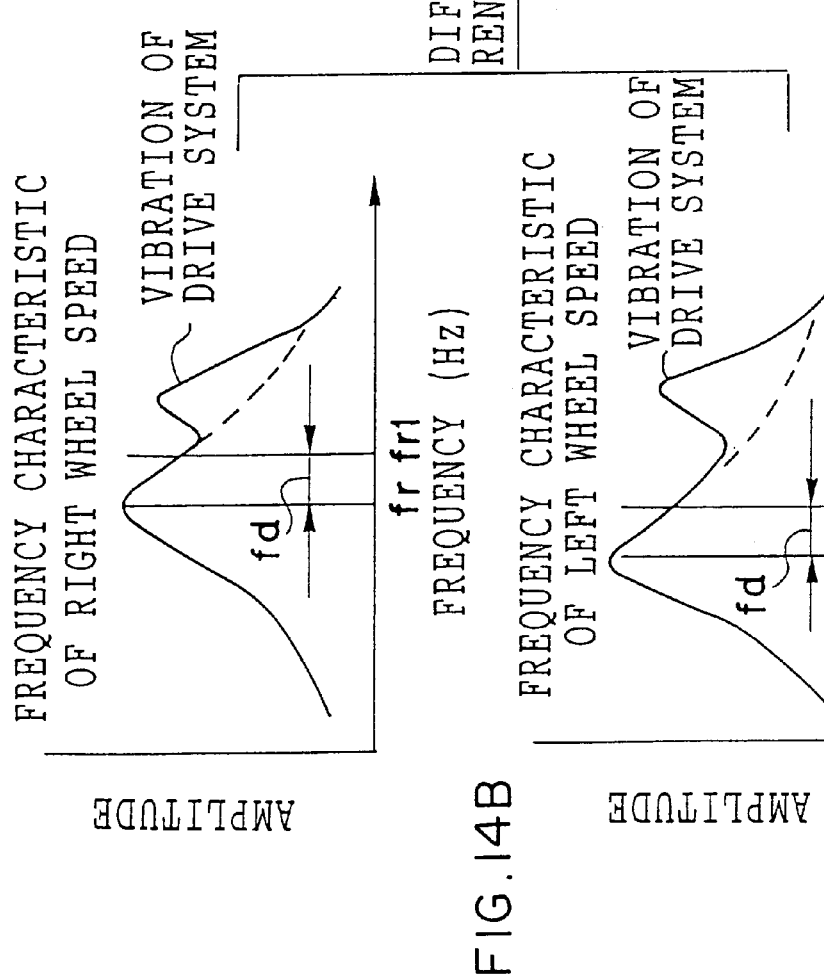
FIG.14A FREQUENCY CHARACTERISTIC OF RIGHT WHEEL SPEED
FIG.14B FREQUENCY CHARACTERISTIC OF LEFT WHEEL SPEED

DEVICE FOR DETECTING WHEEL SPEED SIGNAL FREQUENCY

BACKGROUND OF THE INVENTION

1. Field of the Invention

The present invention relates to a device for estimating the air pressure of a tire, and in particular, to a device for detecting a wheel speed signal frequency from the wheel speed signal of a wheel, and to a device for estimating the state of air pressure of a tire from the wheel speed frequency.

Further, the present invention relates to a device for estimating the state of air pressure of a tire, and in particular, to a device for estimating the state of air pressure of at least one of the left and right wheels from the vibration frequencies of the wheel speed signals of the left and right wheels which are connected by a mechanical element.

2. Description of the Related Art

Devices for estimating the air pressure of a tire inform the driver of abnormalities or the like in a tire of a vehicle. In addition to tire air pressure estimating devices which directly detect the air pressure of a tire, there is the tire air pressure estimating device disclosed in Japanese Patent Application Laid-Open (JP-A) No. 5-133831. The tire air pressure estimating device disclosed in JP-A-5-133831 focuses on the correlation between the air pressure of the tire and the resonance frequency of the tire. The resonance frequency of the tire is detected by a fast Fourier transform (FFT) of the vibration component of the wheel speed. When the resonance frequency is less than a predetermined value, it is judged that there is an air leak in the tire such as a puncture in the tire, and a warning is given.

Further, dynamic system diagnostic devices such as the following have been disclosed in JP-A-7-98268 and JP-A-10-187236. On the basis of the response output vector of the dynamic system, an overall disturbance vector is estimated as the sum of the external disturbance vector applied from the exterior of the dynamic system and the internal disturbance vector generated by problems within the dynamic system. The internal state amount vector of the dynamic system is estimated. By computing the cross-correlation between the estimated overall disturbance vector and the internal state amount vector, the component relating to the internal disturbance is separated from the overall disturbance vector. From this separated component relating to the internal disturbance, the corresponding portion of the dynamic system is diagnosed as a malfunctioning portion. For example, a decrease in the air pressure can be judged by using such a diagnostic device.

In this case, when the dynamic system is a wheel including a tire, the disturbance vector applied from the exterior of the wheel is a vibration input which is inputted to the wheel resonance system. If a malfunction within the tire is an internal disturbance vector generated by a decrease in air pressure, it can be judged that the air pressure of the tire has decreased.

However, the method of computing the resonance frequency in the tire air pressure estimating device disclosed in JP-A-5-133831 is complex.

Further, when the air pressure is determined by using the above-described diagnostic devices (of JP-A-7-98268 and JP-A-10-187236), there may be included a response output in which the magnitude of the response output vector becomes suddenly large, or a response output in which periodic changes are not expressed markedly. If it is determined that the air pressure has dropped on the basis of an output response which includes a response output whose magnitude has suddenly become large, the effect of the response output which has suddenly become large will be too large, and the existing, periodic response output will be hidden in the response output which became large suddenly. Accordingly, the estimated values of the physical amounts for determining the decrease in the air pressure will vary, and the accuracy of judging a decrease in the air pressure will be poor.

Further, conventionally, as described above, the relationship between the vibration frequency of the wheel speed signal and the tire air pressure is constant, and the tire air pressure is estimated by using this relationship. For example, in the tire air pressure estimating device disclosed in Japanese Patent No. 2899741, the tire air pressure is estimated on the basis of the frequency (vibration frequency) of the vibration of the wheel speed signal. Thus, the air pressure of the tire can be estimated without requiring a device for directly detecting the air pressure such as a pressure sensor.

However, in accordance with the air pressure estimating device described above, although the tire air pressure of a non-drive wheel can be estimated accurately, when the left and right wheels are connected by mechanical elements of a drive system in the case of drive wheels, the vibration component transferred from the mechanical elements and unrelated to the tire air pressure is included in the wheel speed signal. Thus, the air pressure of the tire cannot be estimated accurately.

Here, in the invention disclosed in JP-A-8-230422, by using the fact that the vibration components of the drive system transmitted from the mechanical elements are included as same-phase components in the wheel speed signals of the left and right wheels, the tire air pressure is estimated on the basis of a signal corresponding to the difference between the wheel speed signals of the left and right wheels (a signal in which the vibration component of the drive system is removed).

Namely, the above-described invention utilizes the method of least squares and the difference in the estimated disturbances of the left and right drive wheels at the time a predetermined parameter is varied, which estimated disturbances are obtained by an equation of motion of the left and right drive wheels and an equation of state of the left and right drive wheels, and estimates the aforementioned parameter, and estimates the tire air pressure which offsets the vibration component of the drive system.

However, in accordance with the above-described invention, in this device for estimating the tire air pressure of the drive wheels, the amount of computation is larger and more complex than that for non-drive wheels which are not affected by the vibration of the drive system. For example, in the above-described publication (the first embodiment thereof), the order of the matrix of the least squares method used in the tire air pressure estimating device of the non-drive wheels is 2. However, the order of the matrix of the least squares method used in the tire air pressure estimating device of the drive wheels is 4. Thus, the amount of computation which must be performed is twice as much or more. In this way, the computation processing for estimating the tire air pressure is complex.

SUMMARY OF THE INVENTION

In view of the aforementioned, a first object of the present invention is to provide a wheel speed signal frequency detecting device in which the frequency of a wheel speed signal can be determined easily, and to provide a device for estimating a tire air pressure state with high accuracy by the frequency of the wheel speed signal.

Further, in view of the aforementioned, a second object of the present invention is to provide a device for estimating a tire air pressure state by a simple computation processing.

In order to achieve the above-described first object, a first aspect of the present invention is: a device for estimating a state of tire air pressure, comprising: a wheel speed detecting device which detects a wheel speed of a wheel including a tire; a reference value setting device which sets, as a reference value, an amplitude center of the wheel speed signal outputted from the wheel speed detecting device; and a tire air pressure state estimating device which estimates a state of air pressure of the tire on the basis of a number of times the wheel speed signal crosses the reference value.

In accordance with the present invention, the wheel speed, such as the rotational speed of a wheel including a tire, is detected by a wheel speed detecting device, and the wheel speed detecting device outputs a wheel speed signal. The wheel speed detecting device may be a so-called vehicle speed sensor which detects by a sensor, such as a light sensor or a magnetic sensor or the like, a brake rotor or a gear-shaped rotor provided at the hub or the like.

The reference value setting device sets, as a reference value, the amplitude center of the vehicle speed signal outputted from the wheel speed detecting device. For example, by subtracting the value which is the amplitude center of the wheel speed signal from the wheel speed signal outputted by the wheel speed detecting device, the amplitude center of the wheel speed signal can be corrected to the zero reference. Note that the reference value is not limited to the zero reference, and may be any value which enables relative determination of the amplitude of the wheel speed signal.

Further, the wheel speed signal outputted by the wheel speed detecting device is obtained by detecting the wheel speed of the wheel including the tire. As a result, the wheel speed signal and the tire air pressure state are correlated. Further, the reference value setting device sets the amplitude center of the wheel speed signal outputted from the wheel speed detecting device as the reference value. Thus, even if the amplitude center of the wheel speed signal outputted by the wheel speed detecting device greatly varies, the number of times that the wheel speed signal crosses the reference value (number of crossings) is not affected by these fluctuations. Here, the tire air pressure state judging device of the present invention determines the number of times the wheel speed signal crosses a reference value set by the reference value setting device, and judges the tire air pressure state on the basis of the determined number of crossings. Thus, the state of the air pressure of the tire can be judged with high accuracy.

Namely, the tire air pressure state can be easily judged with high accuracy from the detected wheel speed signal, without carrying out complex computation such as fast Fourier transform computation or the like.

The reference value setting device of the present invention may set the reference value on the basis of an amount of change in the wheel speed signal in a predetermined period of time.

In this way, the present invention enables appropriate setting of the reference value by the reference value setting device setting the reference value on the basis of the amount of change in the wheel speed signal in a predetermined period of time. Accordingly, the state of the tire air pressure can be judged with high accuracy.

The first aspect of the present invention can be expressed as follows: a device for estimating air pressure of a tire of a wheel, the device comprising: (a) a wheel speed sensor operable for producing a signal, the signal having at least an amplitude center and a characteristic indicative of rotational speed of a wheel mounted on a tire; (b) a reference value setting device electronically connected to the wheel speed sensor, the reference value setting device receiving the signal and setting substantially the amplitude center of the signal as a reference value; and (c) a data processor which receives the reference value and the signal, the data processor including logic which estimates air pressure in the tire based on a number of times the signal crosses the reference value.

The reference value setting device of the present invention may include a signal converting device which converts the wheel speed signal into a signal which has an amplitude center of the signal equal to the zero reference.

In this way, the reference value setting device sets the amplitude center of the wheel speed signal as the reference, and includes the signal converting device which converts the wheel speed signal into a signal whose amplitude center is the zero reference. In this way, the number of crossings of the wheel speed signal and the reference value can be computed by counting the number of times the sign changes, and computation processing is made easy. Accordingly, the state of the air pressure of the tire can be judged easily and with high accuracy.

The reference value setting device of the present invention may include an amplifying device which amplifies the vehicle speed signal.

In this way, in the present invention, the reference value setting device sets the amplitude center of the wheel speed signal as a reference, and includes the amplifying device which amplifies the wheel speed signal. Truncation errors can thereby be suppressed when the number of crossings of the wheel speed signal and the reference value is computed, and the accuracy of computation can be improved.

The present invention may include a passing device which allows signals only of a predetermined frequency band of the wheel speed signal to pass; and a correcting device for correcting the predetermined frequency band of the passing device on the basis of the frequency detected by the frequency detecting device which detects the frequency of the wheel speed signal.

In this way, in the present invention, the passing device eliminates frequencies other than that of the predetermined frequency band. Namely, components (noise) which are included in the wheel speed signal and are not needed to estimate the tire air pressure state can be eliminated. Further, the correcting device corrects the predetermined frequency band which passes through the passing device on the basis of the frequency of the wheel speed signal detected by the frequency detecting device. Thus, noise included in the wheel speed signal can be removed effectively.

Here, the correcting device can effect correction such that the center of the predetermined frequency band of the passing device equals the frequency detected by the frequency detecting device.

In the present invention, the correcting device makes the center of the predetermined frequency band of the passing device to equal the frequency detected by the frequency detecting device. In this way, the frequency components other than the frequency component of the frequency band needed for detection at the frequency detecting device are eliminated from the wheel speed signal passing through the passing device. Accordingly, the air pressure state can be determined with high accuracy.

Further, the frequency detecting device may detect the frequency of the wheel speed signal on the basis of the number of crossings.

As described above, because the wheel speed of the wheel including the tire is detected, the wheel speed signal outputted from the wheel speed detecting device is correlated with the resonance frequency of the tire. In other words, the frequency of the detected wheel speed signal also is correlated with the tire resonance frequency. Accordingly, on the basis of the frequency of the detected wheel speed signal, the passing device can be set to a predetermined frequency band including the tire resonance frequency.

Further, the frequency detecting device may detect the frequency of the wheel speed signal by the equation f=C/(2TN), wherein the measured time of one wheel speed signal is T, the number of measured samples of wheel speed signals is N, and the number of crossings is C.

The present invention may include a computing device which computes a determination value for selecting the wheel speed signals; and a selecting device for selecting the needed wheel speed signals on the basis of the determination value.

Namely, the determination value for selecting the wheel speed signal is computed by the computing device. On the basis of the determination value, the needed wheel speed signal is selected by the selecting device. Accordingly, the selecting device can select the wheel speed signals having good S/N ratios when the computing device is configured to compute a determination value for selecting signals which includes little noise. Namely, since the tire air pressure state can be judged by the selected wheel speed signal, the tire air pressure state can be judged with high accuracy.

The computing device may compute, as the determination value, a comparison value for comparing the number of crossings of the wheel speed signal and the reference value with the number of crossings of the reference value and the converted signal which has been converted so as to be changed in accordance with changes in the wheel speed signal.

Here, for example, when the number of crossings is determined as described above from a wheel speed signal including noise which becomes large suddenly, the determination value includes many components other than periodic components. Thus, if the wheel speed signal includes noise which becomes large suddenly, the number of times the wheel speed signal crosses the reference value, and the number of times a signal, which has been converted so as to be changed in accordance with changes in the wheel speed signal, crosses the reference value, are different. Accordingly, the wheel speed signals are selected on the basis of a comparison value between the number of times the wheel speed signal crosses the reference value and the number of times a signal, which is converted so as to vary in accordance with changes in the wheel speed signal, crosses the reference value. Thus, wheel speed signals having good S/N ratios can be selected.

Here, the conversion which is carried out such that the wheel signal is varied in accordance with variations in the wheel speed signal may be an nth order difference or an nth order differentiation (wherein n is a natural number).

In this way, noise whose magnitude is extremely large and which is included in the wheel speed signal can be eliminated. Further, by making n equal to about 2, the load of computation for conversion is low, and the noise can be effectively removed.

The state of the air pressure to be estimated may be a state in which the tire air pressure has decreased.

Namely, if the number of times the wheel speed signal and the reference value cross at a time of normal air pressure or a frequency of the tire speed signal at the time of normal air pressure is measured in advance, it is possible to determine whether the tire air pressure state has decreased from the number of times the wheel speed signal crosses the reference value or from the frequency of the wheel speed signal.

The frequency of the wheel speed signal can be detected from the number of times the wheel speed signal crosses the reference value. Thus, the following second aspect of the present invention is proposed. This second aspect of the present invention includes a device for detecting a wheel speed signal frequency, comprising: a wheel speed detecting device which detects a wheel speed of a wheel including a tire; a reference value setting device which sets, as a reference value, an amplitude center of the wheel speed signal outputted from the wheel speed detecting device; and a frequency detecting device which detects a frequency of the wheel speed signal on the basis of a number of times that the wheel speed signal crosses the reference value.

In the second aspect of the present invention, the frequency of the wheel speed signal is detected from the number of times the wheel speed signal crosses the reference value. Thus, the frequency of the wheel speed signal can be detected without carrying out complex computation such as fast Fourier transform or the like.

Next, a third aspect of the present invention will be explained. The third aspect is an aspect intended to achieve the above-described second object, and is a device for estimating a tire air pressure state, comprising: a wheel speed signal detecting device which detects a wheel speed signal of each of left and right wheels including a tire; a first vibration frequency estimating mans which estimates a vibration frequency of each of the wheel speed signals of the left and right wheels; a computing device which computes a difference between the wheel speed signals of the left and right wheels; a second vibration frequency estimating device which estimates a vibration frequency of the difference between the wheel speed signals of the left and right wheels; and an estimating device which estimates a tire air pressure state of at least one of the left and right wheels, on the basis of each of the vibration frequencies of the wheel speed signals of the left and right wheels estimated by the first vibration frequency estimating device, and the vibration frequency of the difference between the wheel speed signals of the left and right wheels estimated by the second vibration frequency estimating device.

The wheel speed signal detecting device detects the wheel speed signals of the left and right wheels. The left and right wheels may be connected by mechanical elements.

The first vibration frequency estimating device estimates the vibration frequency of each of the wheel speed signals of the left and right wheels.

The computation device computes a difference between the wheel speed signals of the left and right wheels. The second vibration frequency estimating device estimates the vibration frequency of the difference between the wheel speed signals of the left and right wheels computed by the computing device.

A vibration component extracting device may further be provided which extracts the vibration components of the wheel speed signals of the left and right wheels detected by the wheel speed signal detecting device. The first vibration frequency estimating device and the, computing device may use, as the wheel speed signals for the left and right wheels, vibration components of the wheel speed signals of the left and right wheels extracted by the vibration component extracting device.

The estimating device estimates the tire air pressure state of at least one of the left and right wheels on the basis of the vibration frequencies of the wheel speed signals of the left and right wheels estimated by the first vibration frequency estimating device, and on the basis of the vibration frequency of the difference between the wheel speed signals of the left and right wheels estimated by the second vibration frequency estimating device. The estimating device may estimate the tire air pressure itself of at least one of the left and right wheels, or may estimate a decrease in the tire air pressure of at least one of the left and right wheels.

Here, generally, the difference between the wheel speed signals of the left and right wheels computed by the computing device corresponds to the difference between the wheel speed signals from which have been removed the effects of the vibrations of the same phases of the left and right wheels. The vibration frequency of the difference between the wheel speed signals of the left and right wheels estimated by the second vibration frequency estimating device corresponds to an intermediate frequency of the frequencies of the left and right wheel speed signals, from which has been removed the effect of vibrations of the same phases caused by the left and right wheels being connected by mechanical elements.

Accordingly, on the basis of the vibration frequency of the difference between the wheel speed signals of the left and right wheels estimated by the second vibration frequency estimating device which is an intermediate frequency of the frequencies of the left and right wheel speed signals, from which the effect of the vibrations of the same phase has been removed, the estimating device of the present invention corrects the vibration frequencies of the wheel speed signals of the left and right wheels estimated by the first vibration frequency estimating device, which includes the effects of the vibrations of the same phases of the left and right wheels.

Namely, the estimation device corrects each of the vibration frequencies of the wheel speed signals of the left and right wheels estimated by the first vibration frequency estimating device, by an average value of differences between, on the one hand, each of the vibration frequencies of wheel speed signals of left and right wheels estimated by the first vibration frequency estimating device, and on the other hand, a vibration frequency of a difference between wheel speed signals of left and right wheels estimated by the second vibration frequency estimating device. On the basis of the corrected vibration frequencies of the wheel speed signals of the left and right wheels, the tire air pressure state of at least one of the left and right wheels is estimated. Accordingly, the vibration frequencies of the wheel speed signals of the left and right wheels can be estimated with high accuracy, and thus, the tire air pressure state of at least one of the left and right wheels can be estimated with high accuracy.

In the present invention as described above, the tire air pressure state of at least one of the left and right wheels is estimated on the basis of the vibration frequencies of wheel speed signals of the left and right wheels and on the basis of a vibration frequency of a difference between the wheel speed signals of the left and right wheels. Thus, the tire air pressure state can be estimated without carrying out complex computation processing.

Here, the left and right wheels may be both drive wheels or both non-drive wheels of a vehicle. In the present invention, the air pressure states of the drive wheel and the non-drive wheel can both be estimated by using the same method. Namely, a common computation processing can be used for both. In this way, because there is no need to provide separate devices for a drive wheel and a non-drive wheel, the structure of the device can be simplified.

BRIEF DESCRIPTION OF THE DRAWINGS

FIGS. 14A and 14B are graphs showing a frequency characteristic of a wheel speed signal.

FIG. 14C is a graph showing a frequency characteristic of a difference in wheel speed signals.

FIGS. 15A through 15C are graphs showing results of experimentation in cases in which the method of the present embodiment is used and in which the method of the present embodiment is not used, wherein FIG. 15A is a graph in a case in which the method of the present embodiment is used, FIG. 15B is a graph in a case in which the method of the present embodiment is not used, and FIG. 15C is a graph of vehicle speeds showing the way in which the vehicle traveled during the experiment.

FIGS. 16A through 16C are graphs showing results of experimentation in cases in which the method of the present embodiment is used and in which the method of the present embodiment is not used, with the way in which the vehicle travels being different than that in FIG. 15, wherein FIG. 16A is a graph of a case in which the method of the present embodiment is used, FIG. 16B is a graph of a case in which the method of the present embodiment is not used, and FIG. 16C is a graph of vehicle speeds showing the way in which the vehicle traveled during the experiment.

DESCRIPTION OF THE PREFERRED EMBODIMENTS

Hereinafter, a first embodiment of the present invention will be described in detail with reference to the drawings.

Figure 1:
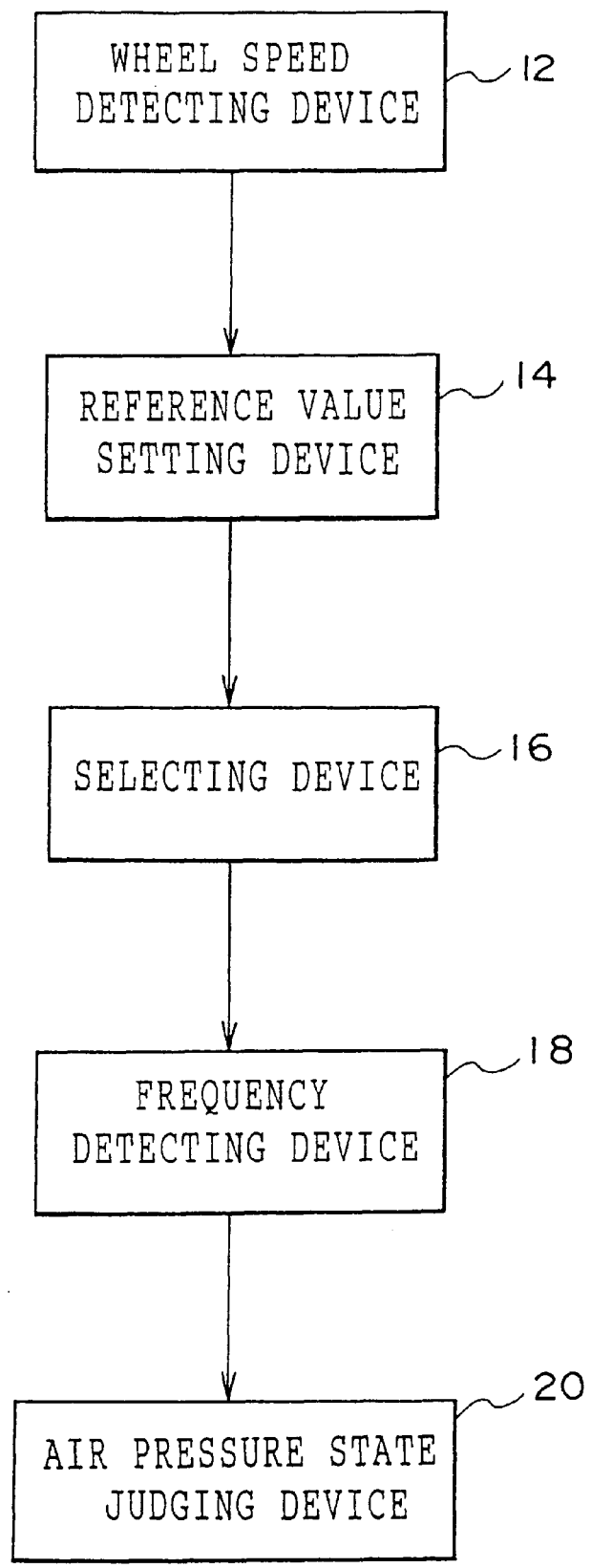
FIG. 1 is a block diagram showing the structure of a device for estimating tire air pressure relating to an embodiment of the present invention.

FIG. 1 is a block diagram illustrating the structure of a tire air pressure estimating device 10, which relates to the embodiment of the present invention and includes a device for detecting the frequency of a wheel speed signal.

As illustrated in FIG. 1, the tire air pressure estimating device 10 is mainly formed by a wheel speed detecting device 12, a reference value setting device 14, a selecting device 16, a frequency detecting device 18, and an air pressure state judging device 20.

Figure 2:
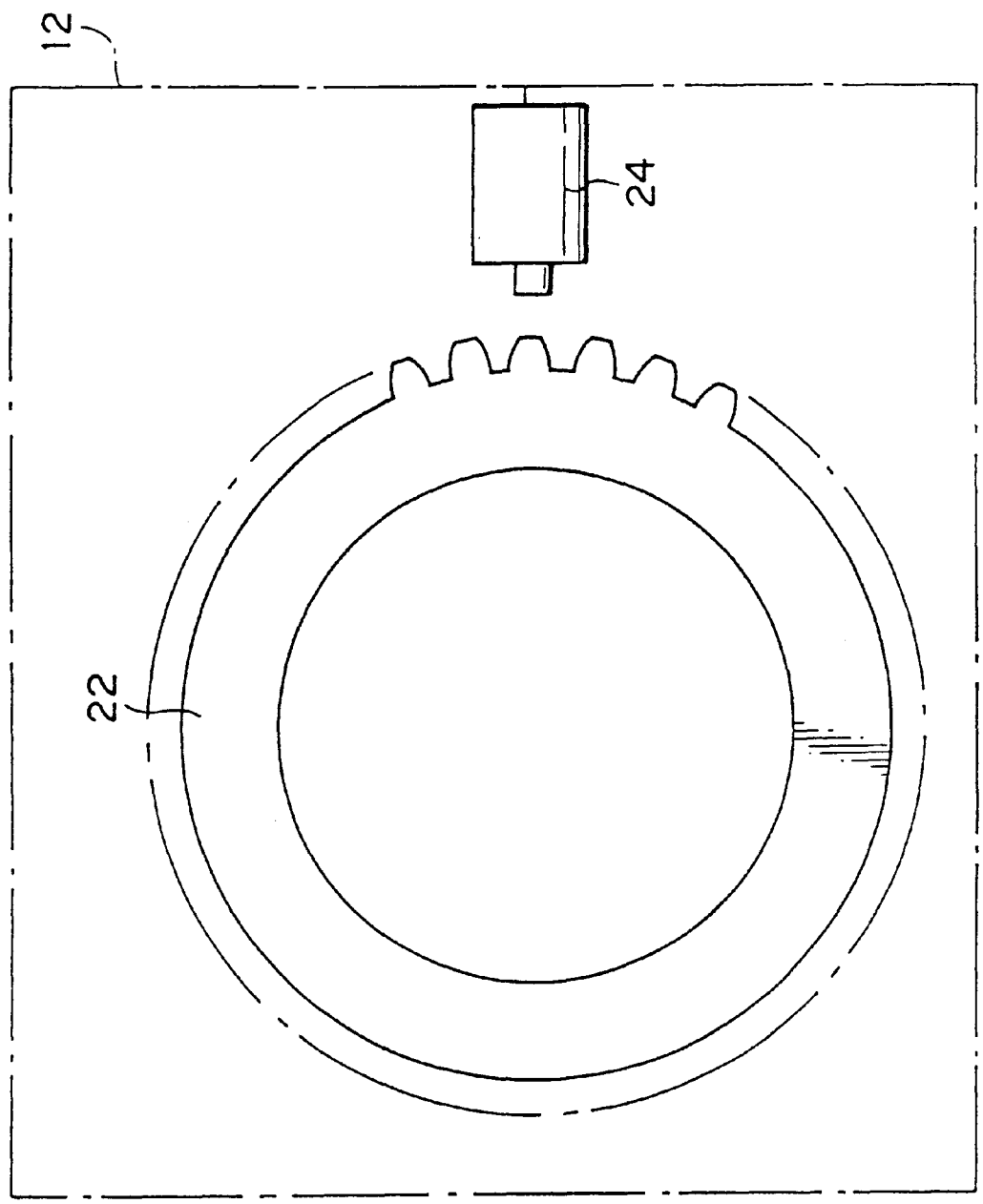
FIG. 2 is a diagram illustrating an example of a wheel speed detecting device.

The wheel speed detecting device 12 detects the wheel speed of a wheel including the tire of a vehicle or the like. For example, the wheel speed detecting device 12 may be formed by a wheel speed sensor which outputs a sensor output signal corresponding to the wheel speed, and a computing device for computing the actual rotational speed of each wheel from the sensor output signal. For example, as illustrated in FIG. 2, a gear-like rotor 22 is provided at a rotating member of the wheel (at the hub or the rotor or the like). The teeth of the rotor 22 which rotates together with the rotation of the wheel are detected by a detector 24 such as a light sensor or a magnetic sensor. An alternating current signal of a frequency proportional to the rotating speed of the wheel is generated by the detector 24, and a computing device computes the wheel speed on the basis of the period of the alternating current signal.

The reference value setting device 14 may be formed by a signal converting device, which converts the amplitude center of the wheel speed signal detected by the wheel speed detecting device 12 into a zero reference, and an amplifying device which amplifies the wheel speed signal. In this way, a reference value of the wheel speed signal can be obtained, and the amplitude of the wheel speed signal can be enhanced by amplifying the wheel speed signal. Namely, the signal converting device converts (processes) the wheel speed signal such that the amplitude center of the wheel speed signal becomes a zero reference. The amplifying device may amplify the converted wheel speed signal which has been converted by the converting device such that the amplitude center of the converted wheel speed signal becomes a zero reference. Alternatively, the signal converting device may convert the amplified wheel speed signal which has been amplified by the amplifying device such that the amplitude center of the amplified wheel speed signal becomes a zero reference. The signal converting device may make the amplitude-center of the wheel speed signal a zero reference by computing the difference between the amount of change in the wheel speed signal in a predetermined period of time and the amount of change in the wheel speed signal in a continuous predetermined period of time. Further, the signal converting device may effect conversion such that the center of the amplitude of the wheel speed signal becomes a zero reference, by passing the wheel speed signal through a high-pass filter or a bandpass filter.

In the present embodiment, a case is described in which the reference value setting device 14 (the above-described signal converting device and amplifying device) converts the amplitude a center of the wheel speed signal to a zero reference by passing the wheel speed signal through a high-pass filter or a bandpass filter. In particular, a case is described in which the filter is a second-order filter. The transfer function H(z) of the filter is $$H(z) = \frac{b_0 z^2 + b_1 z + b_2}{z^2 + a_1 z + a_2} \qquad (1)$$

$$= \frac{b_0 + b_1 z^{-1} + b_2 z^{-2}}{1 + a_1 z^{-1} + a_2 z^{-2}}$$

Here, $a_1$, $a_2$, $b_1$ and $b_2$ are filter coefficients, and $Z^{-1}$ is a 1-sample delay.

In order to realize the filter, the real number coefficients of the filter must be normalized to integer expressions. Here, when the real number $2^{-BBP}$ is normalized so as to correspond to 1 bit at the time the real number coefficients of the filter are expressed as integers, equation (1) is expressed by the following equation.

$$H(z) = \frac{L_{BP} b_0 + L_{BP} b_1 z^{-1} + L_{BP} b_2 z^{-2}}{L_{BP} + L_{BP} a_1 z^{-1} + L_{BP} a_2 z^{-2}} \qquad (2)$$

$$= \frac{B_0 + B_1 z^{-1} + B_2 z^{-2}}{L_{BP} + A_1 z^{-1} + A_2 z^{-2}}$$

Here, $L_{BP} = 2^{BBP}$.

BBP is set such that the coefficient at the time of normalization has a number of digits which is sufficient for computation. By carrying out computation on the basis of this transfer function, the amplitude center of the wheel speed signal can be converted to a zero reference.

The frequency detecting device 18 detects the frequency by counting, for each predetermined period of time, the number of times the wheel speed signal crosses the reference value (zero reference) obtained by the above-described conversion. On the basis of the frequency detected by the frequency detecting device 18, the air pressure state judging device 20 judges the state of the tire air pressure, e.g., judges if there is a drop in the air pressure.

Figure 7:
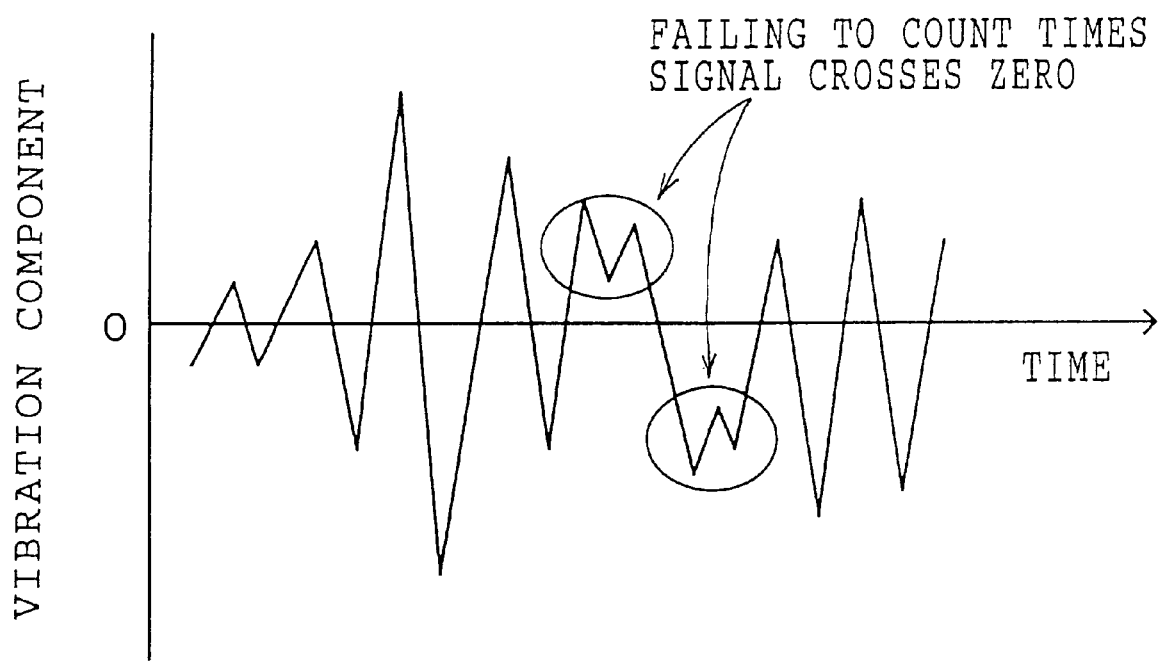
FIG. 7 is a diagram showing a vibration component of a wheel speed signal.

Next, the selecting device 16 will be described. For example, if the S/N ratio of the wheel speed signal is poor due to some type of noise being mixed in the resonance vibration component of the wheel speed signal, as illustrated in FIG. 7, in some sections, the wheel speed signal does not cross zero (the zero reference). In such a case, the frequency detected by the frequency detecting device 18 is smaller than the actual frequency. As a result, the precision of detection of the frequency by the frequency detecting device 18 deteriorates, and the main component of the spectrum is relatively small, thereby leading to an increase in the variation in the estimation. Accordingly, the selecting device 16 selects the wheel speed signals whose S/N ratios are poor as signals not to be used, such that a deterioration in the accuracy of detecting the frequency can be prevented, and such that an increase in the variation in the estimation can be suppressed. Although it is not absolutely necessary to include the selecting device 16, it is better to do so since including the selecting device 16 such as described above allows an improvement in the accuracy of detecting the frequency.

Next, operation of the tire air pressure estimating device 10, which includes the wheel speed signal frequency detecting device structured as described above, will be described.

The wheel speed signal detected by the wheel speed detecting device 12 is outputted to the reference value setting device 14. At the reference value setting device 14, as described above, the amplitude center of the wheel speed signal is converted to a zero reference by the filter using the transfer function of formula (2).

Figure 3:
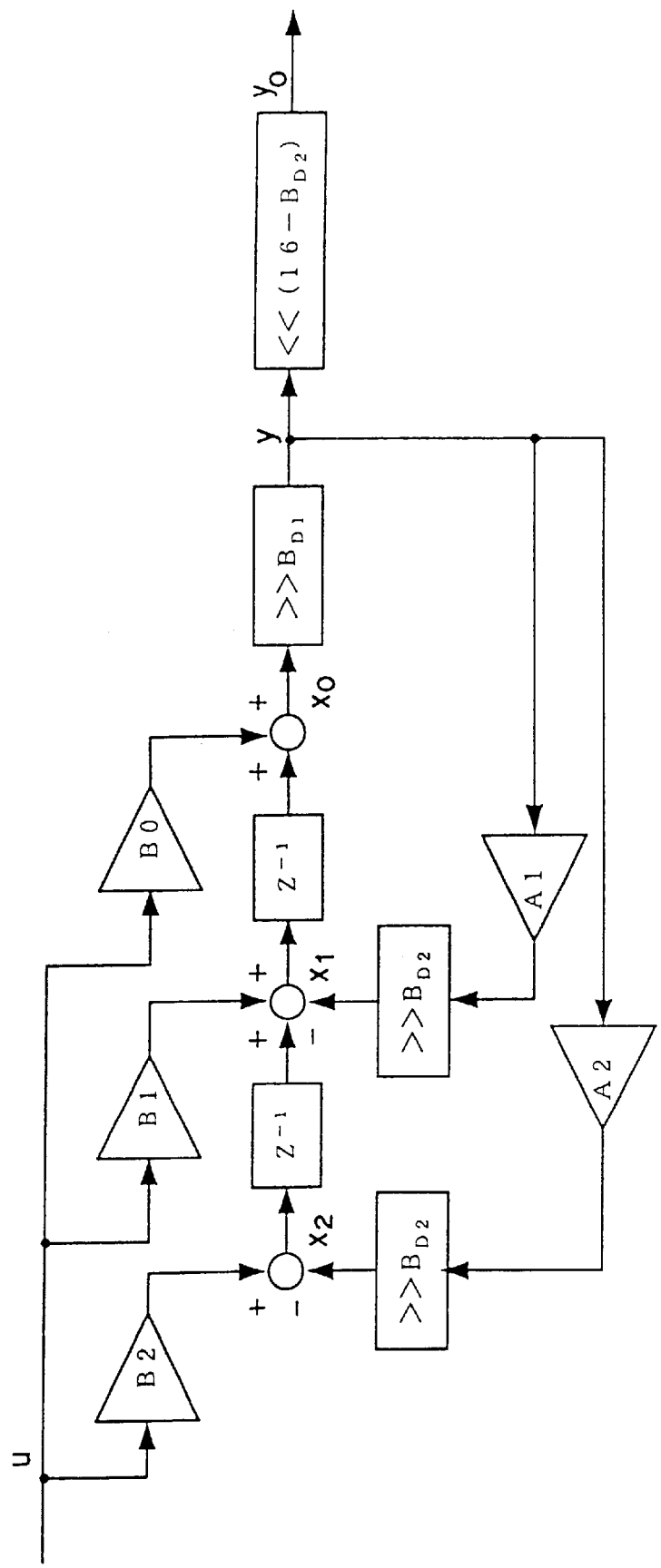
FIG. 3 is a diagram for explaining a transfer function of a filter.

In this case, when calculation is carried out by using the transfer function, the microcomputer must convert the amplitude center of the wheel speed signal to a zero reference such that there is little truncation errors. As a result, calculation such as shown in FIG. 3 is carried out. Here, the data length used in the computation carried out by the microcomputer is in accordance with the following specifications. When addition and subtraction are carried out, 16 bit length±16 bit length→16 bit length, 32 bit length±32 bit length→32 bit length. When multiplication is carried out, 16 bit length×16 bit length→32 bit length.

Note that an N-bit right shift means multiplying by $2^{-N}$ (wherein N is a natural number), and an N-bit left shift means multiplying by $2^{N}$. Further, in FIG. 3, a bit right shift is denoted by ">>", and a bit left shift is denoted by "<<".

In FIG. 3, the input u, the internal output y and the constants $A_1$, $A_2$, $B_0$, $B_1$, $B_2$ are each a length of 16 bits. First, $X_0$ is computed by adding the output of the second delay operator to the product of the input u and $B_0$.

$X_0$ is a length of 32 bits. However, because $A_1$ and $A_2$ must be multiplied in the feedback loop of the filter, $X_0$ must be brought down to a length of 16 bits. More specifically, $X_0$ is shifted right by $B_{BP}$ bits.

Here, in FIG. 3, $X_0$, which has a bit length of 32 bits, is right shifted so as to take up a length of 16 bits. If the right shift amount at this time is $B_{D1}$, $X_0$ which has been right shifted by $B_{D1}$ bits is y. Further, the remaining bit shift amount $B_{D2}=B_{BP}-B_{D1}$ must be right shifted, but this computation is carried out after the multiplication of y and $A_1$, $A_2$.

Here, although $X_0$ should have been right shifted by $B_{BP}$ bits originally, $X_0$ is right shifted by $B_{D1}$ bits actually. Thus, as a result, the computation is the left shifting of y by $B_{BP}-B_{D1}$ bits, i.e., an increase of the amount of 2 to the $B_{BP}-B_{D1}$ power.

In this way, the truncation errors at the time of computation can be decreased to the range of the restrictions on the data length at the time of computation. Further, the filter output is the internal output y of the filter which has been right shifted by $B_{D2}$ bits. However, truncation error occurs by bit shifting by this amount. Thus, the internal output y is right shifted by $B_{D2}$ bits after being left shifted by 16 bits in advance (amplified $2^{16}$ times). Namely, as a result, the internal output y is left shifted by (16-$B_{D2}$) bits. The output $y_0$ obtained here is an output which has been amplified. Thus, the precision of detecting the crossing with a reference value can be increased.

Figure 4A:
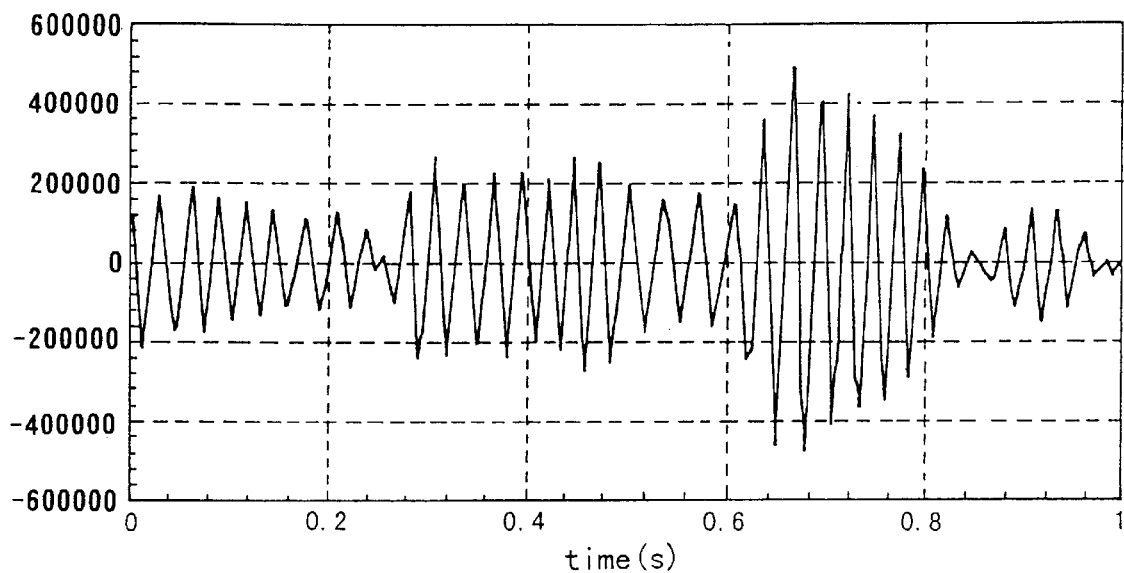
FIG. 4A is a diagram illustrating a vibration component wave form of the wheel speed signal in a case in which the amplitude center of the wheel speed signal is converted to a zero reference such that there is little truncation errors and the wheel speed signal is amplified.
Figure 4B:
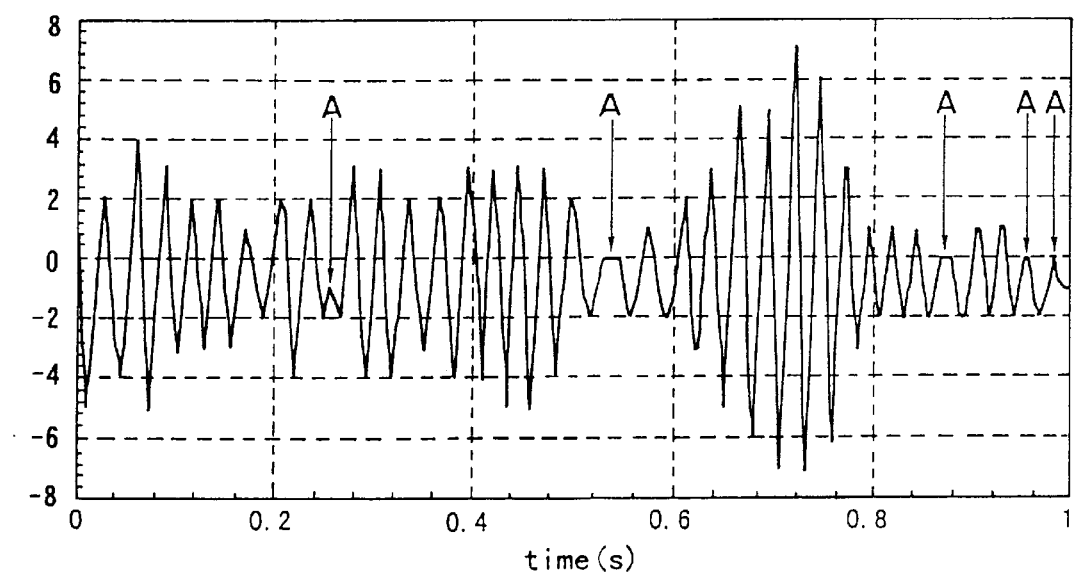
FIG. 4B is a diagram illustrating a vibration component wave form of the wheel speed signal in a case in which the amplitude center of the wheel speed signal is only converted to a zero reference.

FIG. 4B illustrates a vibration component waveform of the wheel speed signal in a case in which the amplitude center of the wheel speed signal is only converted to a zero reference. The portions designated by the arrows A in FIG. 4B are the portions in which the signal does not cross the zero reference due to a truncation error at the time of computation. It can thus be understood that the accuracy of detecting the crossing points of the wheel speed signal and the zero reference is poor.

In contrast, in FIG. 4A, the wheel speed signal is passed through the above-described high-pass filter or bandpass filter, which are the signal converting device and the amplifying device of the reference value setting device 14. In this way, the wheel speed signal is processed (corrected) such that the amplitude center of the wheel speed signal becomes the zero reference, and a vibration component waveform obtained by amplifying the output (wheel speed signal) at this time is shown in FIG. 4A. As can be seen from FIG. 4A, the portions indicated by the arrows A in FIG. 4B are corrected, and the precision of detecting the crossings of the wheel speed signal and the zero reference is improved.

Note that, in this computation, after the internal output y of the filter is right shifted by $B_{D2}$ bits, even if it is left shifted by 16 bits (amplified $2^{16}$ times), the information lost due to the bit shifting can not be recovered. Thus, after the left shifting by 16 bits (the $2^{16}$ time amplification), the internal output y must be shifted right by $B_{D2}$ bits.

Further, although the internal output y is amplified $2^{16}$ times, the a amplification is not limited to this value, and may be any value which sufficiently ensures the precision of detection of the zero reference crossings of the wheel speed signal.

Figure 5:
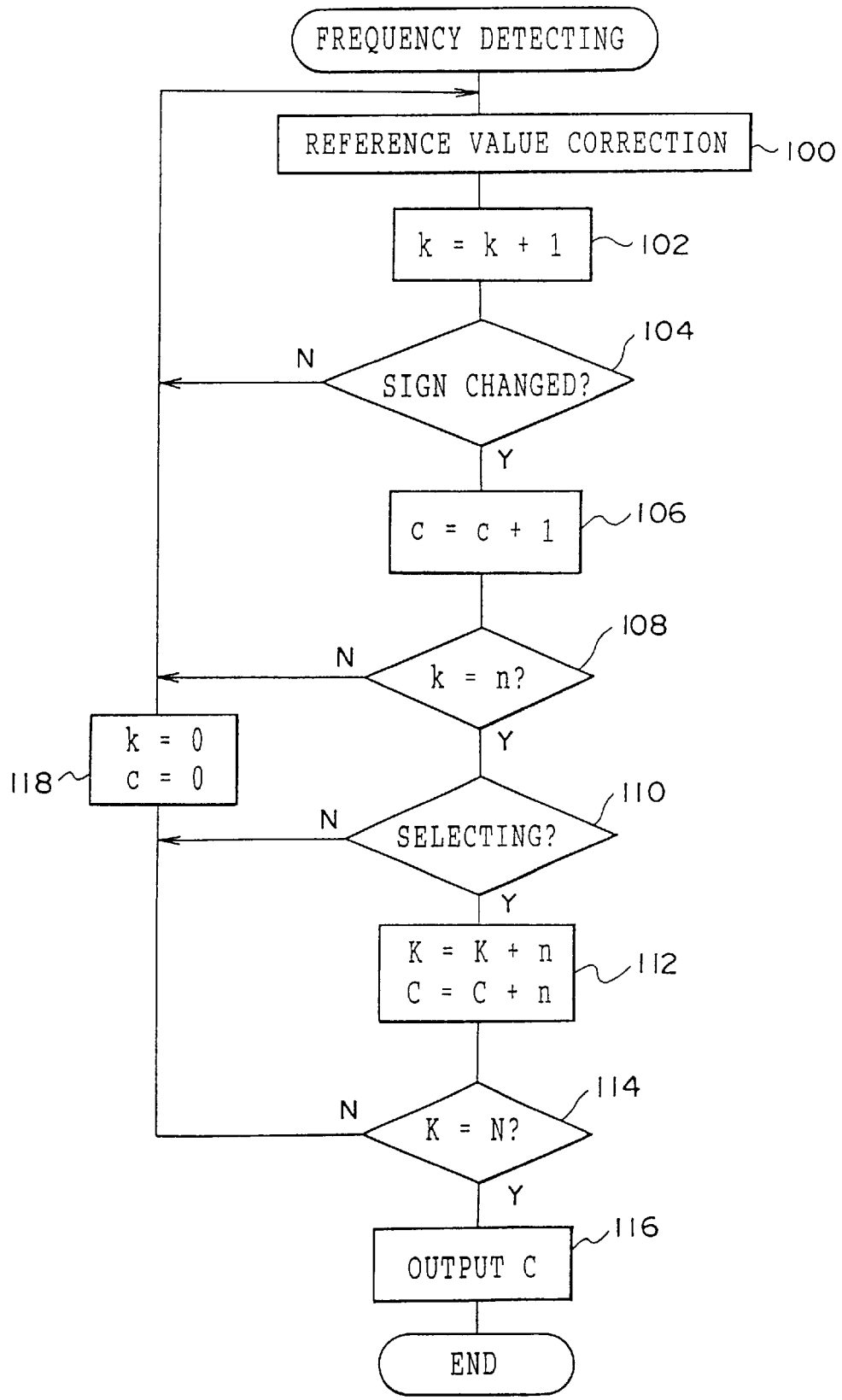
FIG. 5 is a flowchart showing frequency detecting processing.

Next, frequency detecting processing will be described with reference to the flowchart in FIG. 5.

First, in step 100, the corrected (converted) wheel speed signal is inputted such that the amplitude center becomes a reference value (zero reference) due to the reference value setting device 14 as described above, and the process moves on to step 102. In step 102, 1 is added to k which is the number of times that frequency detecting processing has been carried out within a predetermined period of time (a short section) (i.e., the number of times it has been determined whether the sign of the wheel speed signal has changed), and the routine moves on to step 104. In step 104, a determination is made as to whether the sign of the wheel speed signal has changed, i.e., whether the observation sample has crossed the zero reference.

In step 104, if a determination is made that the sign has not changed, the routine returns to step 100 and steps 100 through 104 are repeated. In step 104, if it is determined that the sign has changed, the routine moves on to step 106. In step 106, 1 is added to the number of times c that the sign has changed (the number of times the sign is judged is totaled), and the process moves on to step 108.

In step 108, a determination is made as to whether k=n. Namely, a determination is made as to whether the aforementioned number of times k has reached a prescribed number of times n which prescribes the predetermined period of time (short section). If it is judged that k≠n in step 108, the routine returns to step 100 and above-described steps 100 through 108 are repeated until it is judged that k=n in step 108.

Further, if it is judged in step 108 that k=n, the routine moves on to step 110 where selecting (to be described in detail later) is carried out by the selecting device 16, and a determination is made as to whether selecting is to be carried out. When the answer to the determination is affirmative, the routine moves on to step 112.

In step 112, K=K+n and C=C+c, and the routine proceeds to step 114. In step 114, a determination is made as to whether K=N, i.e., whether the sample number K is the predetermined value N.

When the answer to the determination in step 114 is affirmative, the routine moves on to step 116, and the frequency is detected by the frequency detecting device 18 on the basis of the total number of times C that the wheel speed signal has crossed the zero reference. Namely, the frequency can be detected by substituting the total number C of times the sign had changed, the predetermined number N, and the measured time T of one wheel speed signal into the equation f=C/(2TN).

On the other hand, if the answers to the determinations in steps 110 and 114 are negative, the routine proceeds to step 118 where the number of times k that frequency detection processing is carried out and the cumulative value c of the number of times the sign has changed are set to 0, and the routine returns to step 100. The processings from step 100 are repeated until the determinations in each of steps 110 and 114 are affirmative.

Figure 6A:
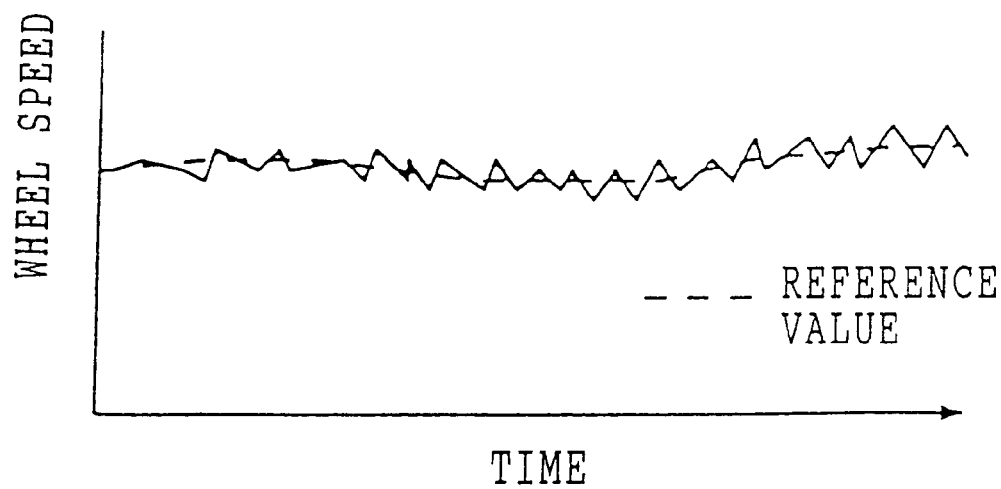
FIG. 6A is a diagram showing an example of a wheel speed signal.
Figure 6B:
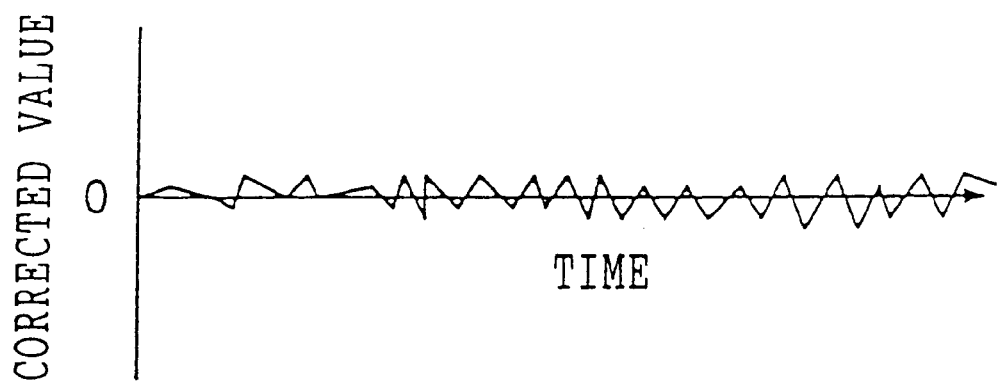
FIG. 6B is a diagram showing a wheel speed signal in which the amplitude center of the wheel speed signal is corrected to a zero reference.
Figure 6C:
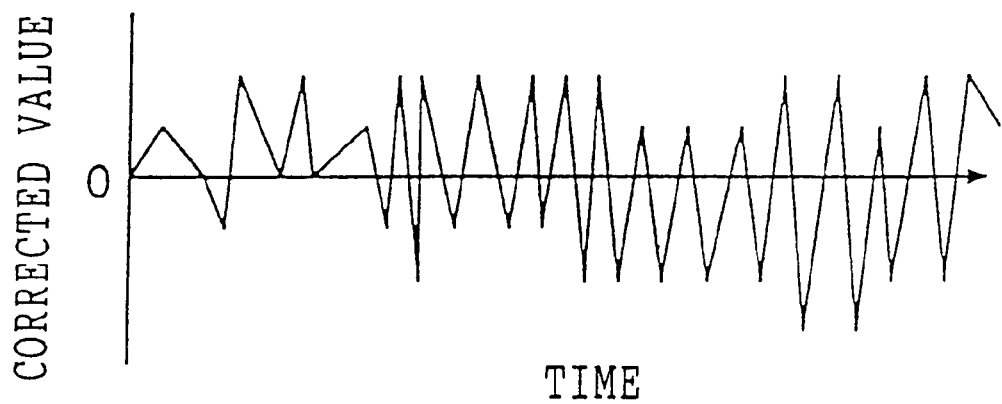
FIG. 6C is a diagram showing a wheel speed signal in which the amplitude center of the wheel speed signal is corrected to a zero reference and the wheel speed signal is amplified.

In this way, in the tire air pressure estimating device 10 of the present embodiment, the wheel speed signal (see FIG. 6A) detected by the wheel speed detecting device 12 is, by the reference value setting device 14, corrected (see FIG. 6B) such that the amplitude center of the wheel speed signal becomes the zero reference, and the wheel speed signal is amplified (see FIG. 6C). Then, by counting the number of times within a predetermined period of time that the wheel speed signal crosses the zero reference (the number of times the sign is reversed), the frequency of the wheel speed signal can be detected. Thus, the frequency of the wheel speed signal can be easily detected without carrying out a complex computation such as a fast Fourier transform computation or the like.

The selecting device 16 selects the wheel speed signals as follows by using features which enable the resonance frequencies of the wheel speed signals to be easily sensed.

Given that the number of times that the wheel speed signal, which has passed through the bandpass filter, crosses the zero reference during a predetermined section is c1, and that the number of times, during the same section, that a signal, which is the nth differential (or nth difference) (wherein n is a natural number) of the previously-mentioned signal, crosses the zero reference is c2, the difference therebetween, α, (which may be a quotient (corresponding to the determination value)), is calculated by equation (3):

$$\alpha = c2 - c1 \quad (3)$$

When α exceeds a predetermined value, the count value of the number of times of crossings of the wheel speed signal and the zero reference is not used.

By carrying out such a determination, as illustrated in FIG. 7 for example, the greater the number of times the wheel speed signal fails to cross the zero reference, the greater α is. Thus, a decrease in the estimated frequency (the frequency detected by the frequency detecting device 18) can be suppressed.

Figure 10A:
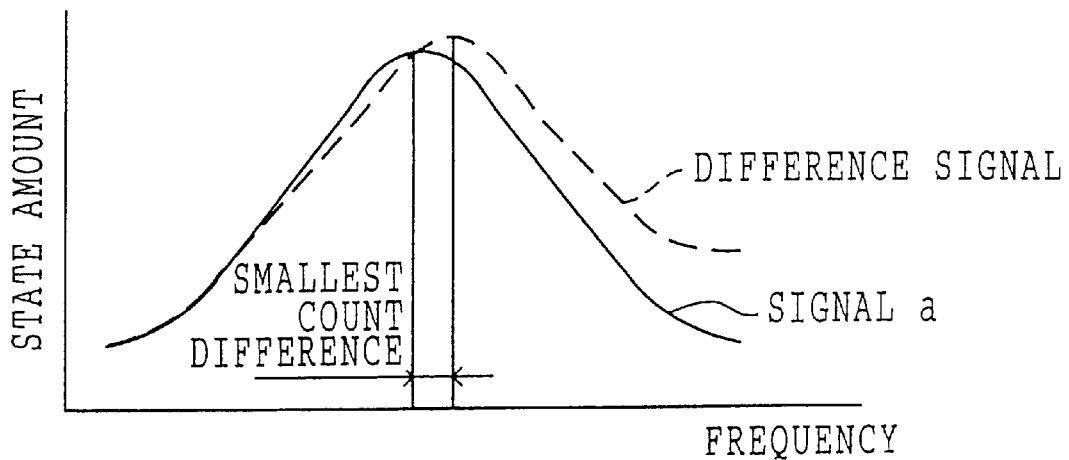
FIGS. 10A and 10B are diagrams for explaining the relationship between the resonance frequencies and differences in count values of the number of times a signal crosses the zero reference of a difference signal.
Figure 10B:
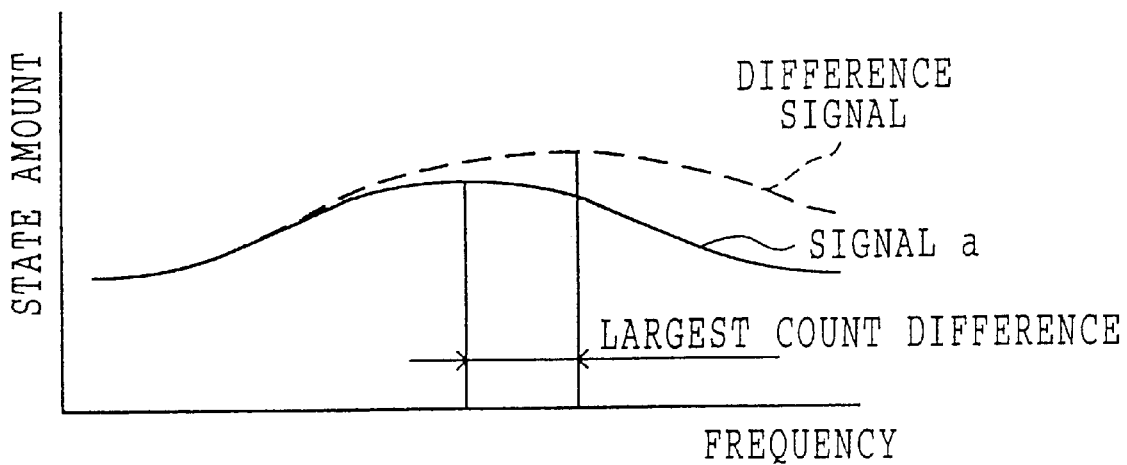

Further, a signal whose S/N ratio is poor is sensitive to the above-described differential operation, and thus, it is possible not to use such signals. For example, as illustrated in FIGS. 10A and 10B, in the case of a signal a whose S/N ratio is good, the difference, at the peaks, between the signal a and the difference signal is small (see FIG. 10A). However, in the case in which the S/N ratio is poor, the difference, at the peaks, between the signal a and the difference signal is large (see FIG. 10B). This can be theoretically explained as follows.

Here, when the resonance characteristic of the wheel speed signal is approximated by a second-order characteristic, the wheel speed signal follows the characteristic of the following formula.

$$\omega(s) = \frac{\omega_n^2}{s^2 + 2\zeta\omega_n s + \omega_n^2} d \quad (4)$$

Here, d is the input from the road surface, and ζ is the damping coefficient of the resonance system. The larger ζ, the more the resonance is damped. The critical-damping (the point at which resonance is eliminated) is at $\zeta = 1\sqrt{2}$.

The peak angle frequency in equation (3) is $$\omega_{p0} = \omega_n \sqrt{1 - 2\zeta^2} \quad (5)$$

The peak angle frequency of the signal obtained by first-order differentiation of equation (3) is:

$$\omega_{p1} = \omega_n \quad (6)$$

The peak angle frequency of the signal obtained by second-order differentiation is:

$$\omega_{p2} = \frac{\omega_n}{\sqrt{1 - 2\zeta^2}} \quad (7)$$

Here, by using the peak angle frequency of a second-order differential signal, the following equation is obtained when the determination value is derived in the same way as in equation (3).

$$\beta = \omega_{p2} - \omega_{p0} = \omega_n \left( \frac{1}{\sqrt{1 - 2\zeta^2}} - \sqrt{1 - 2\zeta^2} \right) \quad (8)$$

The value β is 0 when ζ=0, and monotonically increases as ζ increases. At $\zeta \to 1\sqrt{2}$, β is .

Accordingly, it can be understood that the determination values β also is a large value with respect to a signal having a poor S/N ratio (i.e., a signal having a large ζ). However, in actuality, because the signal is passed through a bandpass filter, the signal is saturated at a value determined by the pass band.

Further, in a case in which the signal includes noise which becomes extremely large suddenly (such as engine noise), conversely, ζ approaches 0. Thus, by providing a predetermined threshold value at the lower side of a as well, the noise which becomes extremely large suddenly can be eliminated.

Note that the difference of the peak angle frequency of a first-order differential signal is $$\omega_{p1} - \omega_p = \omega_p \{1 - \sqrt{(1 - \zeta^2)}\}$$

In this way, for the same ζ, the difference between peak angle frequencies of a second-order differential signal is greater than the difference between peak angle frequencies of a first-order differential signal. Namely, the sensitivity is higher. A third-order differential signal is even more sensitive than a second-order differential signal. In general, by calculating the difference between peak angle frequencies of an nth order differential signal (wherein n is a natural number), the S/N ratio of the signal can be determined, and by making n greater, the sensitivity of the selecting can be improved.

The same phenomenon occurs with respect to the difference in the number of times of zero crossing which is correlated with the resonance frequency of the signal. In general, selecting can be carried out by the difference in the number of zero crossings of an nth order difference signal (or an nth order differential signal).

However, in consideration of the calculation load and the errors in calculation which occur at the time of difference calculation, it is preferable to make n not overly large, and a value of about n=2 is desirable.

In the present embodiment, the total number of times C that the sign changes during plural selected time periods (short sections) is outputted at the time a determination is made as to whether the sample number K has become a predetermined value N, and the frequency is detected. However, for example, the frequency may be detected at the time when the total number of times C exceeds a predetermined value, or when the number of times the signal used in the frequency detection is selected at the selecting device 16 has become the predetermined value.

In the present embodiment, the frequency is detected by using the total number of times the wheel speed signal crosses a reference value in a plurality of selected time periods (short sections). However, a value, which is obtained by statistically processing the total number of times of crossing of the wheel speed signal and a reference value in a selected plural periods of time (i.e., a median value (central value) or a most frequent value or the like), may be used.

Figure 11:
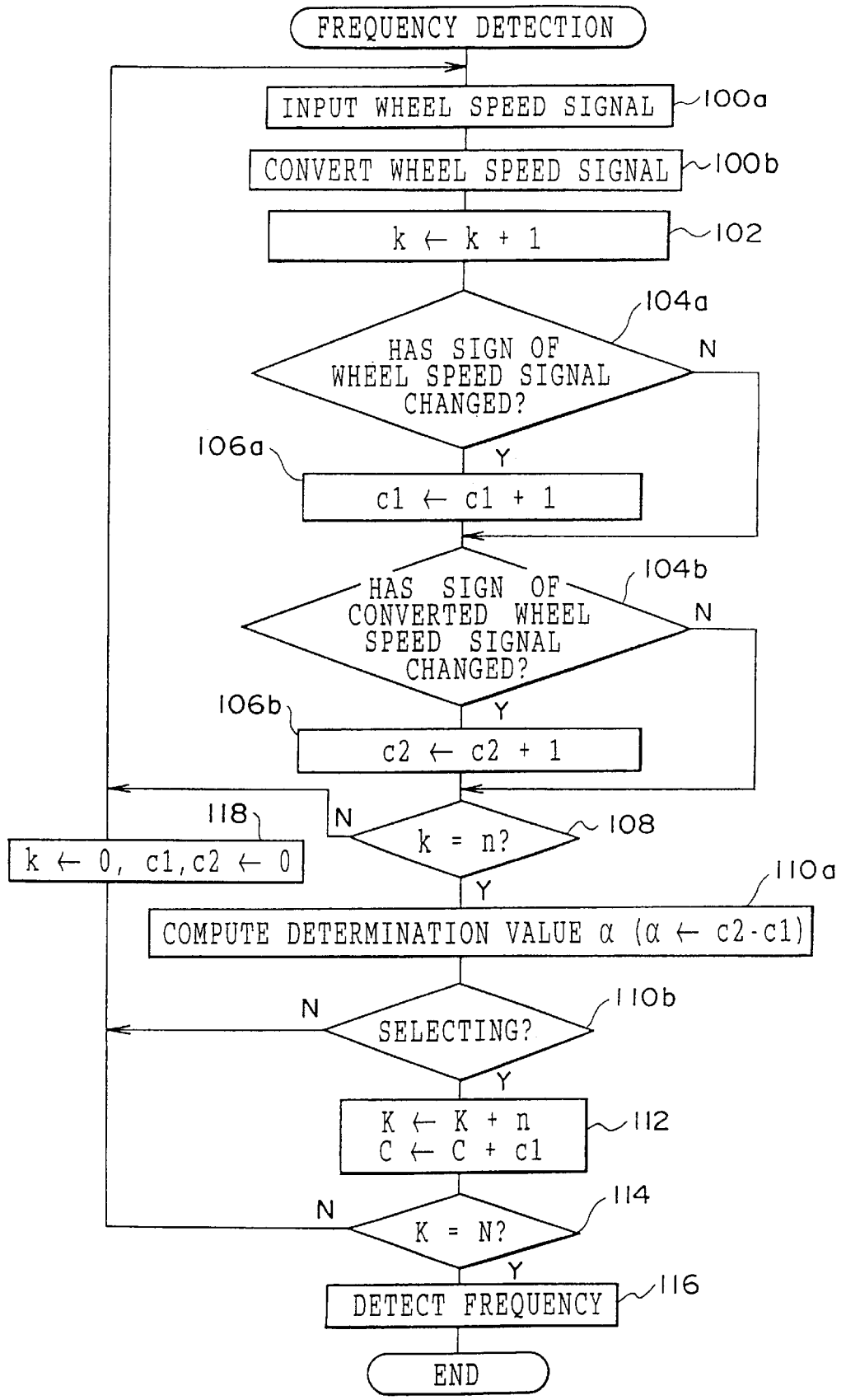
FIG. 11 is a flow chart for additional explanation of the frequency detection processing of FIG. 5.

Here, the above frequency detecting processing will be described in further detail with reference to the flowchart in FIG. 11. In the present processing, as described above, the period of time necessary for frequency detection is divided into short sections, the number of crossings during each short section is counted, and the wheel speed signals are selected.

First, in step 100a, a wheel speed signal whose reference value has been corrected (converted) by the reference value setting device 14 is inputted. In step 100b, the inputted wheel speed signal is converted so as to change in correspondence with the change in the wheel speed signal. For example, the wheel speed signal is differentiated (or the difference of the wheel speed signal is calculated) n times (wherein n is a natural number). In subsequent step 102, the number 1 is added to the variable k which represents the number of times a determination was made, during the short section, as to whether the sign of the wheel speed signal changed. In step 104a, a determination is made as to whether the sign of the wheel speed signal is changed, i.e., the observed sample (wheel speed signal) has crossed the zero reference.

When it is determined in step 104a that the sign has changed, in step 106a, the number 1 is added to the number c1 of times the sign of the wheel speed signal has changed (i.e., the number of times the sign is determined is totaled), and the routine moves on to step 104b. Note that when it is determined in step 104a that the sign has not changed, the routine moves on to step 104b.

In step 104b, a determination is made as to whether the sign of the wheel speed signal, which was converted in step 100b, has changed. If it is determined in step 104b that the sign has changed, in step 106b, the number 1 is added to the number of times c2 that the sign of the wheel speed signal converted in step 100b changed (i.e., the number of times the sign is determined is totaled), and the routine moves on to step 108. Note that when it is determined in step 104b that the sign has not changed, the routine moves on to step 108.

In step 108, a determination is made as to whether k=n, i.e., as to whether the variable k has reached the prescribed number of times n prescribing the number of the short sections. If it is determined in step 108 that k≠n, the routine returns to step 100a, and steps 100a through 108 are repeated until k=n in step 108.

When it is determined in step 108 that k=n, in step 110a, the determination value a (see equation (3)) is computed as described above, and in step 110b, selecting is carried out as described above on the basis of the determination value. Namely, a determination is made as to whether the number of times c1 that the sign has changed should be used for detecting the frequency. When the determination is affirmative, the routine proceeds to step 112.

In step 112, K is set to K+n, and C is set to C+c1, and the routine moves on to step 114 where a determination is made as to whether K=N, i.e., as to whether the sample number K has reached the predetermined value N (as described above, N is the sample detection number corresponding to the period of time (TN) necessary for detecting the frequency). Namely, K (=K+n) is the number of times that a determination is carried out as to whether the sign of the wheel speed signal has changed, within all of the short sections which have been used in the processing up to the present step 114 and which are necessary in order to detect the frequency. When K has become N, it means that a determination has been made as to whether the sign of the wheel speed signal has changed over the period of time necessary for frequency detection.

Accordingly, when the answer to the determination in step 114 is affirmative, in step 116, the frequency is detected by the frequency detecting device 18 on the basis of the total number of times C that the wheel speed signal has crossed the zero reference during the period of time (TN) required for frequency detection. Namely, the frequency can be detected by substituting the total number C of times the sign changed, the predetermined number N, and the measured time T for one sample into the equation f=C/(2TN).

On the other hand, when the determinations in step 110b and step 114 are negative, the routine proceeds to step 118. The variables k, c1 and c2 are set to 0, and the routine returns to step 100a.

Figure 12:
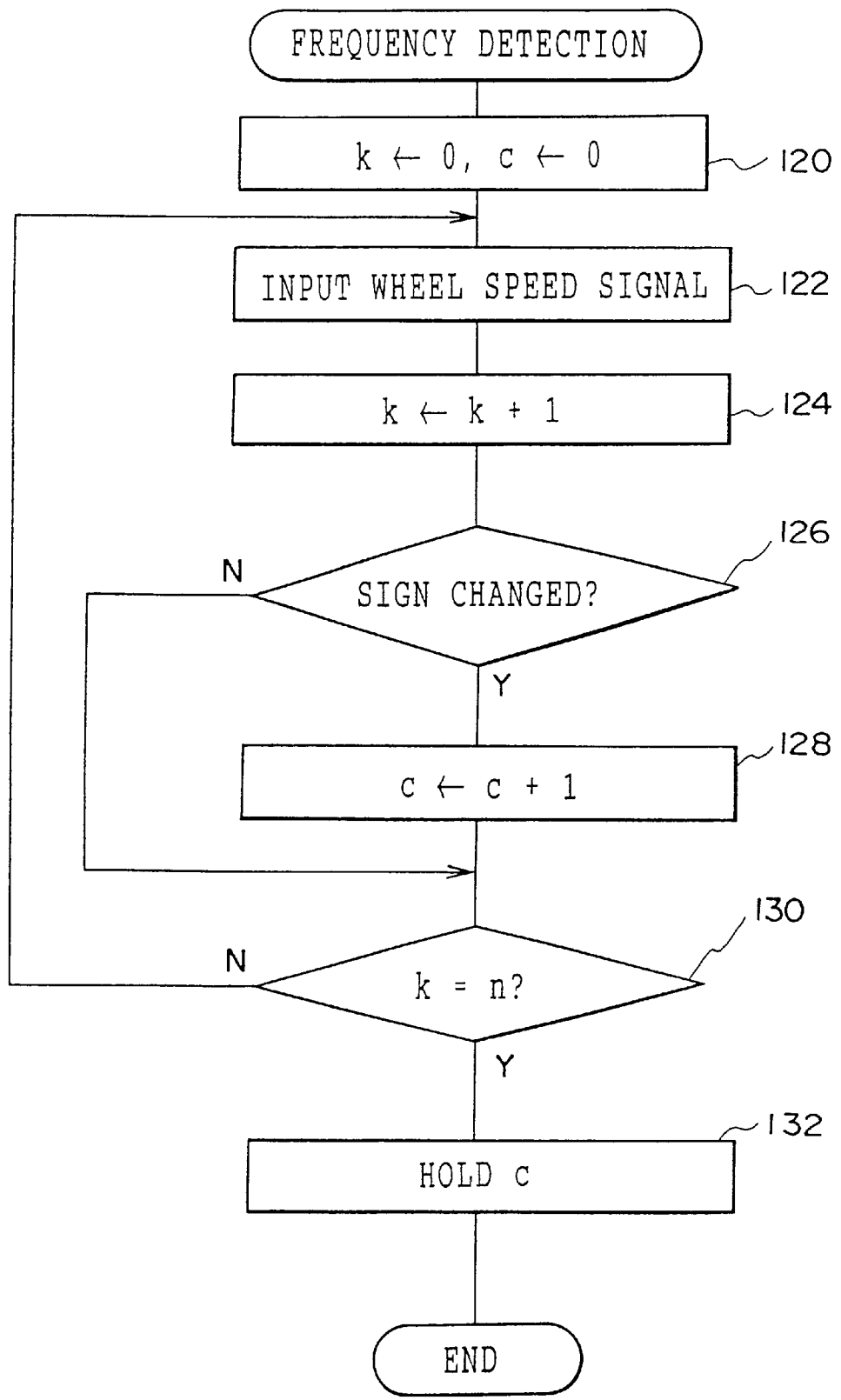
FIG. 12 is a flowchart showing frequency detection processing relating to a modified example.

In the example described above, the period of time necessary for frequency detection is divided into short sections, the number of crossings per each short section is counted, and selecting of the wheel speed signals is carried out. However, the present invention is not limited to the same, and the following structure is possible. First, the above-described selecting of the wheel speed signals (computation of the determination values and selecting based on the determination values) of the wheel speed signals is carried out per short section. The wheel speed signals of each of the short sections which have been selected in order to detect the frequency are stored in a memory. The wheel speed signals stored in the memory are read out in order, and the frequency detecting processing shown in FIG. 12 is carried out.

Namely, in step 120, k and c (c1) are initialized. In step 122, the wheel speed signal stored in the memory is read out and inputted, and k (the number of times of determination of a change in the sign during the short section) is incremented by 1. In step 126, in the same way as described above, a determination is made as to whether the sign has changed. If it is determined that the sign has not changed, the routine proceeds to step 130. If it is determined that the sign has changed, c (c1) (the number of times the sign has changed) is incremented by 1, and a determination is made as to whether k has become n (the value prescribing the short section) in step 130.

If k has not yet become n, the routine returns to step 122, and the above-described processings (steps 122–130) are carried out. When k has become n, the number of times the sign has changed is held.

Then, the above-described processings are carried out on the wheel speed signal for each short section selected in order to detect the frequency, and the frequency is determined from the equation (f=C/(2TN)), from the above-described values of T, N and from the sum (C) of the number of times the sign has changed which is held for each short section.

Next, air pressure state determination, which is carried out by the air pressure state determining device 20 on the basis of the number of crossings detected as described above, will be described.

Variations in the tire air pressure are detected from variations in the number of crossings, by detecting the number of crossings as described above from the wheel speed signal detected by the wheel speed detecting device 12 at normal air pressure.

Figure 8:
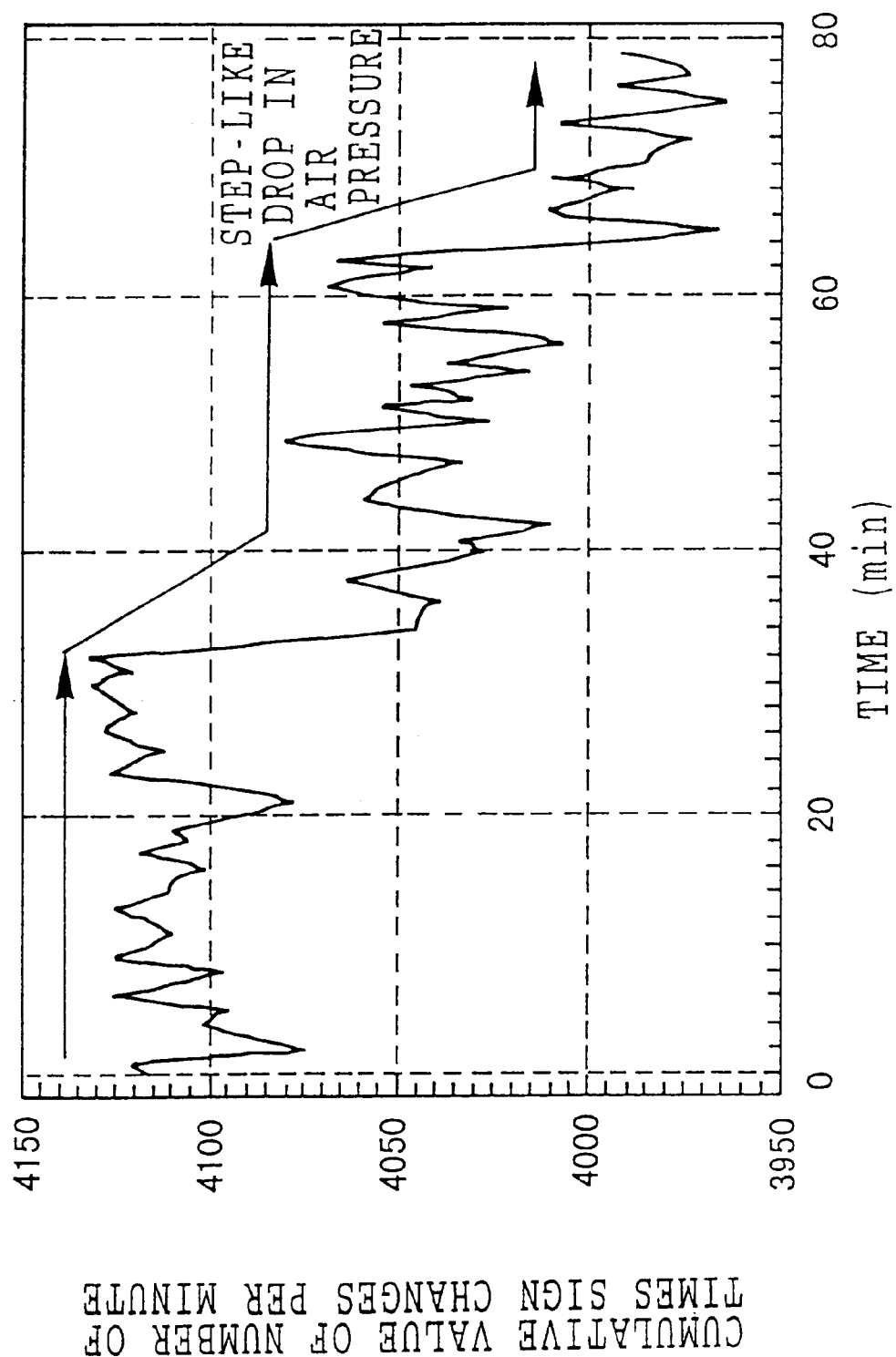
FIG. 8 is a diagram showing frequency variations at the time tire air pressure drops stepwise.

As illustrated in FIG. 8, when the tire air pressure at a certain speed has fallen in steps, the cumulative value of the number of crossings of the wheel speed signal and the zero reference per, for example, one minute, changes. Specifically, as the air pressure of the tire decreases, the number of crossings decreases, and thus there is a correlation between the tire air pressure and the cumulative value of the number of crossings of the wheel speed signal and the zero reference. Namely, it is possible to judge a decrease in the tire air pressure from the number of crossings of the wheel speed signal and the zero reference. Further, because the frequency can be computed from the cumulative value of the number of crossings per minute, there is a correlation between the tire air pressure and the frequency computed by the frequency detecting device 18. Accordingly, by measuring in advance the frequency of the tire air pressure at an ordinary time, when the air pressure of the tire decreases over time, the decrease in the tire air pressure can be sensed by detecting the frequency from the wheel speed signal at that time.

Further, by storing, in advance and for each speed, the frequency of the wheel speed signal corresponding to the tire air pressure, the tire air pressure can be estimated from the frequency detected by the frequency detecting device 18.

Next, a modified example of the tire air pressure estimating device of the present embodiment will be described.

Figure 9:
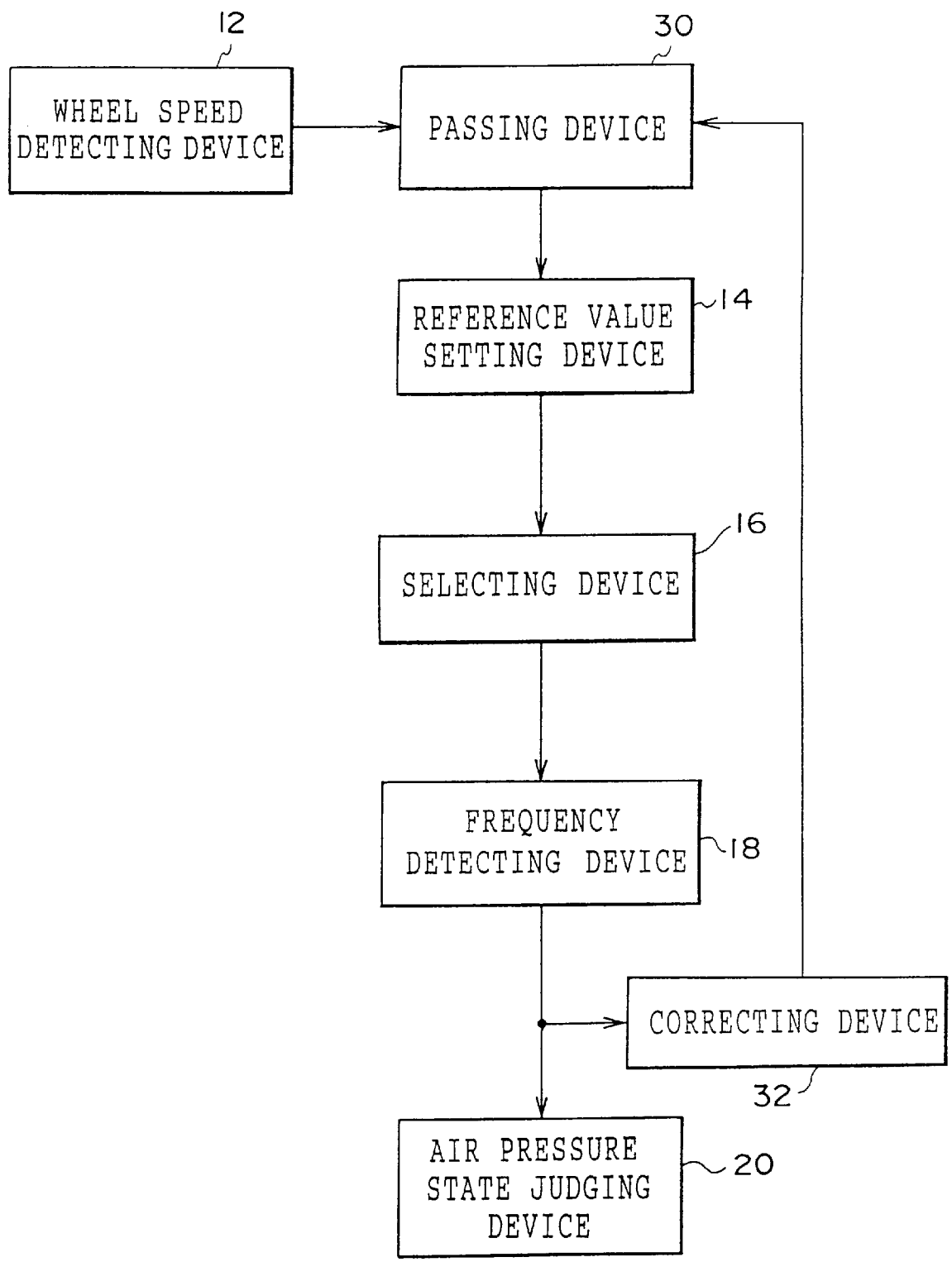
FIG. 9 is a block diagram illustrating a modified example of a tire air pressure estimating device relating to an embodiment of the present invention.

As illustrated in FIG. 9, the tire air pressure estimating device further includes a passing device 30 and a correcting device 32, as compared to the above-described tire air pressure estimating device 10. The passing device 30 only allows the passing through of a wheel speed signal detected by the wheel speed detecting device 12 which is in a predetermined frequency band. On the basis of the frequency detected as described above by the frequency detecting device 18, the correcting device 32 corrects the predetermined frequency band at which the wheel speed signals are allowed to pass through the passing device 30, such that the center of the predetermined frequency band equals the aforementioned detected frequency.

The passing device 30 only allows the passing through of components of a predetermined frequency of the wheel speed signal of each wheel detected by the wheel speed detecting device 12. For example, the passing device 30 may be a bandpass filter which allows the passing through of only frequency components of a given band centered around a frequency which is estimated to be the resonance frequency of the wheel speed signal. Or, the passing device 30 may be a high pass filter which allows the passing through of only the frequency components of a high frequency band including the resonance frequency components.

By providing the passing device 30 in this way, only the frequency components relating to the tire air pressure are extracted. Further, the predetermined frequency passing through the passing device 30 is corrected by the correcting device 32. Thus, most of the unnecessary noise can be eliminated, and the accuracy of detection of the tire air pressure can be improved.

Next, a second embodiment of the present invention will be described.

Figure 13:
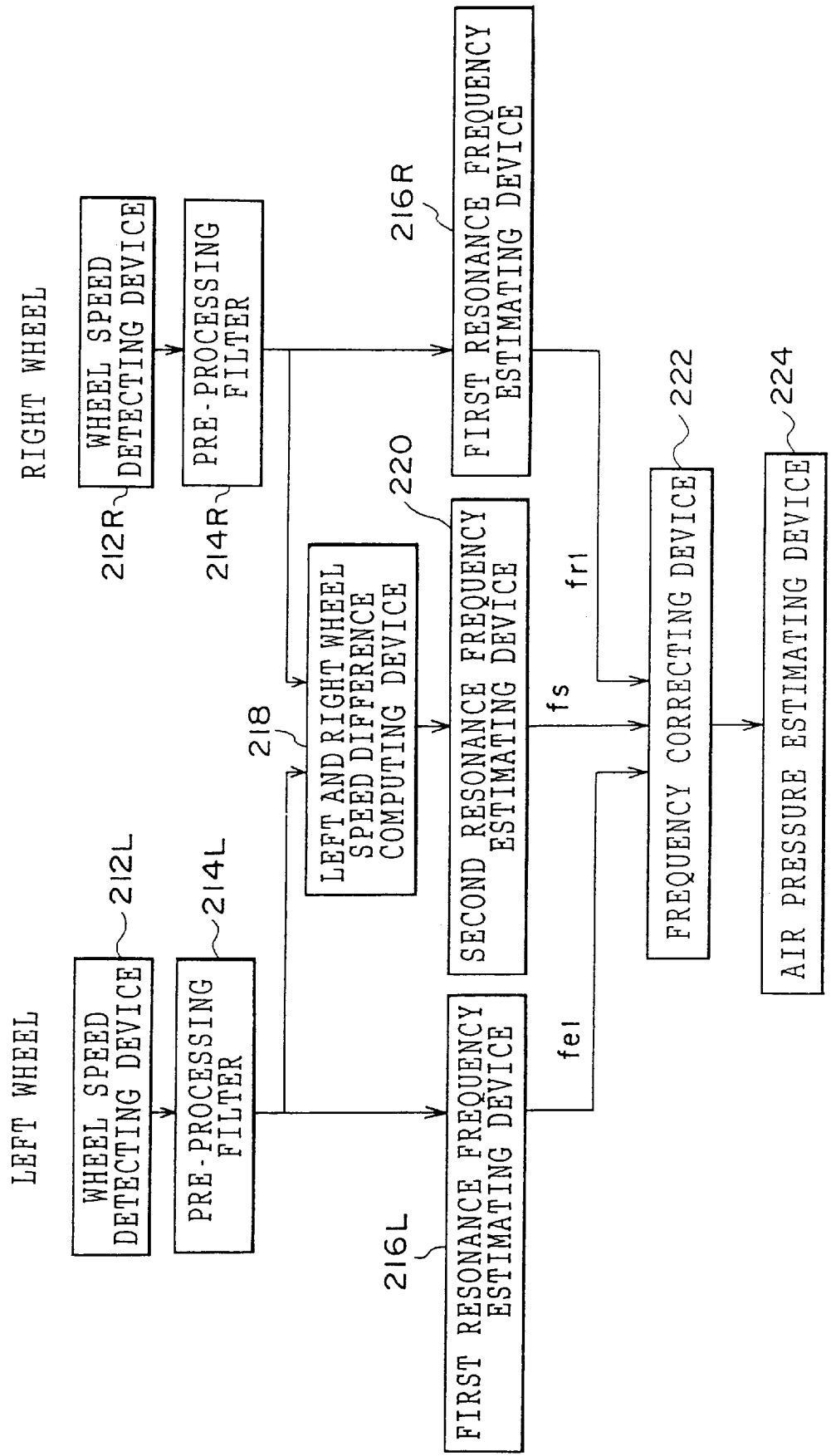
FIG. 13 is a block diagram of a tire air pressure estimating device relating to the present embodiment.

As illustrated in FIG. 13, the tire air pressure estimating device relating to the present embodiment has wheel speed detecting device 212R, 212L for detecting the wheel speed signals of the left and right wheels which are connected by mechanical elements in a vehicle. Pre-processing filters 214R, 214L are connected to the wheel speed detecting device 212R, 212L. The pre-processing filters 214R, 214L extract the vibration components which cause tire resonance of the left and right wheels, in the wheel speed signals detected by the wheel speed detecting device 212R, 212L. First resonance frequency estimating device 216R, 216L are connected to the pre-processing filters 214R, 214L, respectively. The first resonance frequency estimating device 216R, 216L estimate the vibration frequencies (resonance frequencies) of the wheel speed signals from the vibration components caused by tire resonance of the left and right wheels extracted from the pre-processing filters 214R, 214L.

A left and right wheel speed difference computing device 218 is connected to the pre-processing filters 214R, 214L and computes the difference between the vibration components respectively caused by the tire resonance of the left and right wheels and extracted by the pre-processing filters 214R, 214L. A second resonance frequency estimating device 220 is connected to the left and right wheel speed difference computing device 218. The second resonance frequency estimating device 220 estimates, from the difference between the vibration components caused by the tire resonance of the left and right wheels computed by the left and right wheel speed difference computing device 218, the vibration frequency of this difference.

A frequency correcting device 222 is connected to the first resonance frequency estimating device 216R, 216L and to the second resonance frequency estimating device 220. The frequency correcting device 222 corrects the vibration frequency of the wheel speed signal of each of the left and right wheels estimated by the first resonance frequency estimating device 216R, 216L, on the basis of the vibration frequency of the wheel speed signal of each of the left and right wheels estimated by the first resonance frequency estimating device 216R, 216L, and the vibration frequency of the difference between the vibration components caused by the tire resonance of the left and right wheels and estimated by the second resonance frequency estimating device 220. An air pressure estimating device 224 is connected to the frequency correcting device 222. The air pressure estimating device 224 estimates the tire air pressure of each of the left and right wheels from the vibration frequency of the wheel speed signal of each of the corrected left and right wheels.

Next, operation of the present embodiment structured as described above will be described. Note that, hereinafter, a case will be described as an example in which the air pressure of the tire of a drive wheel of the vehicle is estimated. However, the present invention is equally applicable to the estimation of the air pressure of tires of the left and right wheels other than the drive wheels (i.e., the estimation of the air pressure of the tires of the wheels connected by mechanical elements).

The wheel speed detecting device 212R, 212L detect the wheel speed signals of the left and right wheels of the vehicle. Here, the left and right wheels are connected by mechanical elements for driving. At the upper limit and lower limit cut-off frequencies, the pre-processing filters 214R, 214L extract (bandpass filter process) the vibration components caused by the tire resonance of the left and right wheels in the wheel speed signals detected by the wheel speed detecting device 212R, 212L.

The first resonance frequency estimating device 216R, 216L estimate the vibration frequency of the wheel speed signal from the frequency components extracted by the pre-processing filters 214R, 214L. Details of the method of estimation will be described later. Here, as illustrated in FIG. 14A and FIG. 14B, the frequency characteristic of the vibration of the wheel speed signal of each of the left and right wheels is generally such that the frequency of the drive system vibration which does not depend on the air pressure is positioned near to the frequencies (values to be determined) $f_r$, $f_l$ of the respective left and right wheels which vary depending on the air pressure of the tires.

When the vibration frequencies are estimated by the first resonance frequency estimating device 216R, 216L from the wheel speed signals having such a frequency characteristic, the estimated values of the frequencies of the respective left and right wheels are affected by the vibration of the drive system, and become $f_{r1}$, $f_{l1}$, respectively, and the vibration frequencies of the wheel speeds cannot be detected accurately.

Here, as described above, because the left and right wheels are connected by mechanical elements for driving, the vibration of the driving system is unrelated to the air pressure, and has the same phase and substantially the same amplitude at both the left and the right wheels. From these, the affect that the driving system vibration has on the detected value of the vibration frequency is about the same at the left and right wheels. As a result, the following relationships are established between the detected values of the vibration frequencies and the actual vibration frequencies.

$$f_{r1} = f_r + f_d \tag{9}$$

$$f_{l1} = f_l + f_d \tag{10}$$

Here, $f_d$ is the degree of the affect that the driving system vibration has on the detected value.

The left and right wheel speed difference computing device 218 computes the difference of the above-described vibration components extracted by the pre-processing filters 214R, 214L. Here, as described above, the vibration component caused by the tire resonance at each of the left and right wheels includes the frequency of the left or right wheel which varies in accordance with the tire air pressure, and the frequency of the driving system vibration which does not depend on air pressure. As described above, the driving system vibration which does not depend on air pressure has the same phase and approximately the same amplitude at both the left and right wheels. On the other hand, each of the left and right wheels receives a different, non-uniform effect from the physically different road surfaces on which the wheels travel. Thus, the phases of the frequencies at the left and right wheels which vary in accordance with the tire air pressure differ. Accordingly, as illustrated in FIG. 14C, the frequency characteristic of the difference between the vibration components respectively caused by the tire resonance at the left and right wheels, which difference is calculated by the left and right wheel speed difference computing device 218, has peaks at frequencies $f_r$, $f_l$ of the left and right wheels which vary in accordance with the tire air pressure. Then, when the vibration frequency of the difference between the vibration components respectively caused by the tire resonance of the left and right wheels is estimated by the second resonance frequency estimating device 220 from the difference between the vibration components calculated by the left and right wheel speed difference computing device 218, the two peaks of the frequencies $f_r$, $f_l$ are calculated as a single peak. Accordingly, the frequency $f_S$ of the difference between the vibration components respectively caused by the tire resonance of the left and right wheels, which is computed by the second resonance frequency estimating device 220, becomes the value expressed by the following formula.

$$f_S = (f_r + f_l)/2 \tag{11}$$

From these relationships, the difference between the vibration frequency $f_{r1}$ of the right wheel detected by the first frequency detecting device 212R and the vibration frequency $f_S$ of the difference between the left and right wheel speeds detected by the second resonance frequency detecting device 220 is $$f_{r1} - f_S \tag{12}$$

The difference between the vibration frequency $f_{l1}$, of the left wheel detected by the first frequency detecting device 212L and the resonance frequency $f_S$ of the difference between the left and right wheel speeds detected by the second resonance frequency detecting device 220 is $$f_{l1} - f_S \tag{13}.$$

The average value $\Delta f = (f_{r1} - f_S + f_{l1} - f_S)/2$ of these two differences is $$\Delta f = (f_{r1} + f_{l1} - 2f_S)/2 \tag{14}.$$

The average value $\Delta f$ is a value equal to $f_d$ determined by the above relational expression.

Here, the frequency correcting device 222 corrects the frequencies $f_{r1}$, $f_{l1}$ of the wheel speed signals of the left and right wheels estimated by the first resonance frequency estimating device 216R, 216L using the average value $\Delta f$ as the correction value. Namely, as in equations (15) and (16), the frequencies $f_{r1}$, $f_{l1}$ of the wheel speed signals of the left and right wheels estimated by the first resonance frequency estimating device 216R, 216L are reduced by the average value $\Delta f$.

$$f_r = f_{r1} - \Delta f (= f_d) \tag{15}$$

$$f_l = f_{l1} - \Delta f (= f_d) \tag{16}.$$

Then, the air pressure estimating device 224 estimates the tire air pressure of each of the left and right wheels from the corrected vibration frequency of the wheel speed signal of each of the left and right wheels. Namely, for example, the frequency at normal air pressure is stored in advance as a reference value, and the change in the air pressure is estimated from a map or the like which relates the amount of change in the air pressure with the deviation of the detected vibration frequency from a reference value.

Figure 15A:
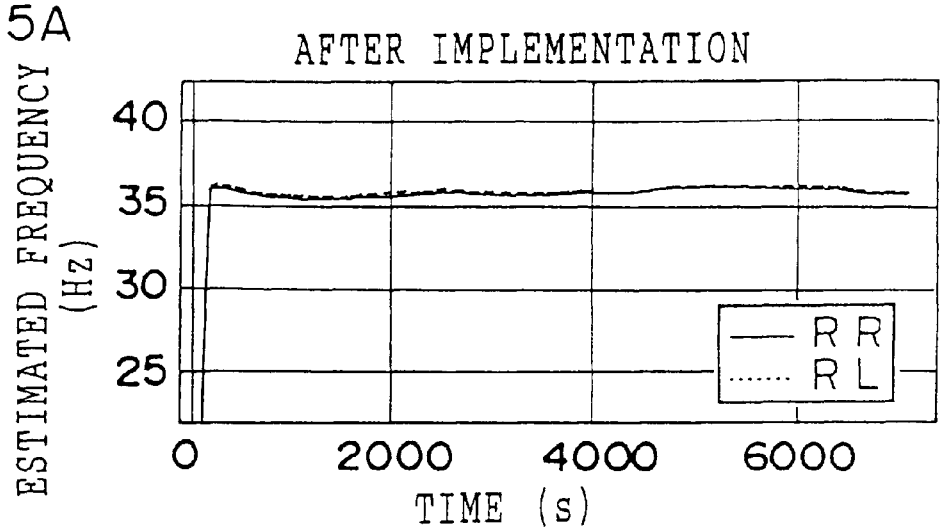
Figure 15B:
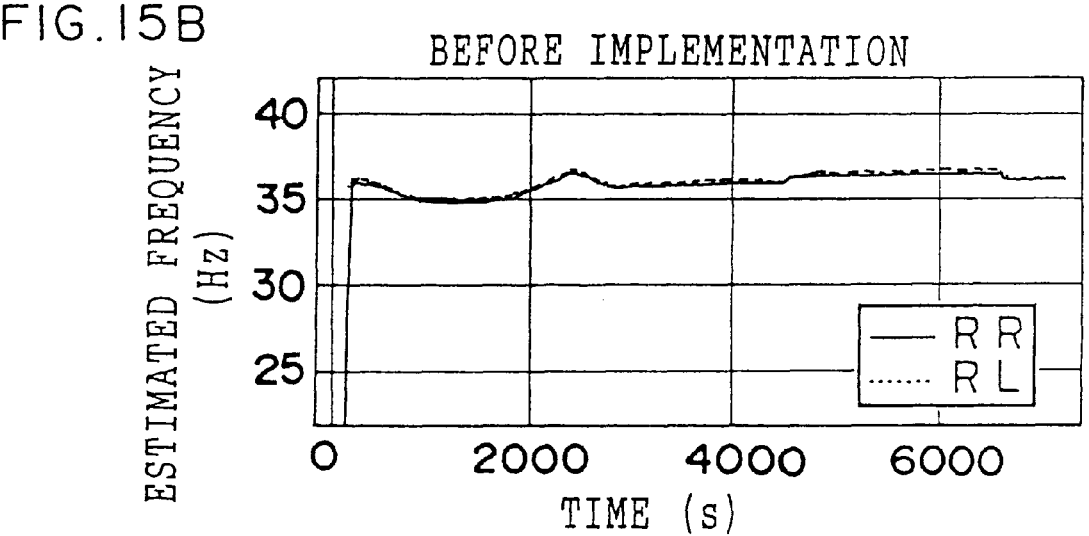
Figure 15C:
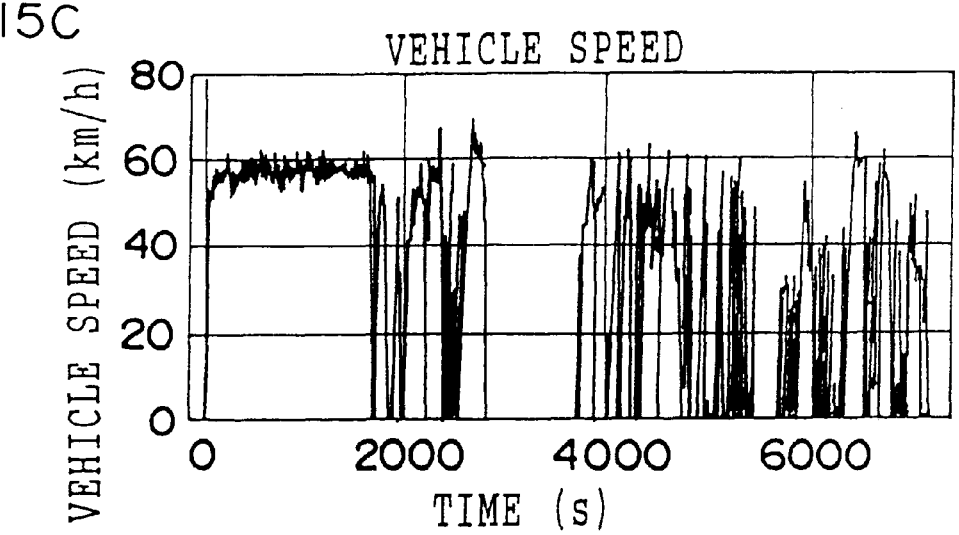
Figure 16A:
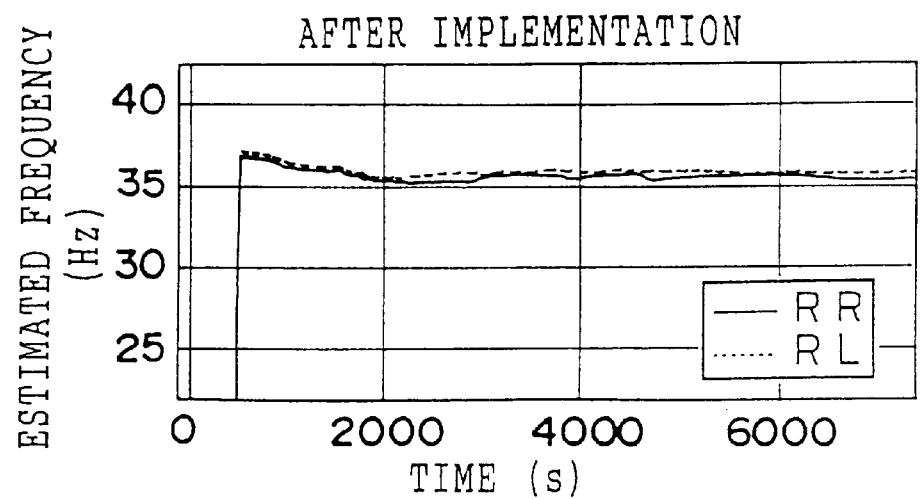
Figure 16B:
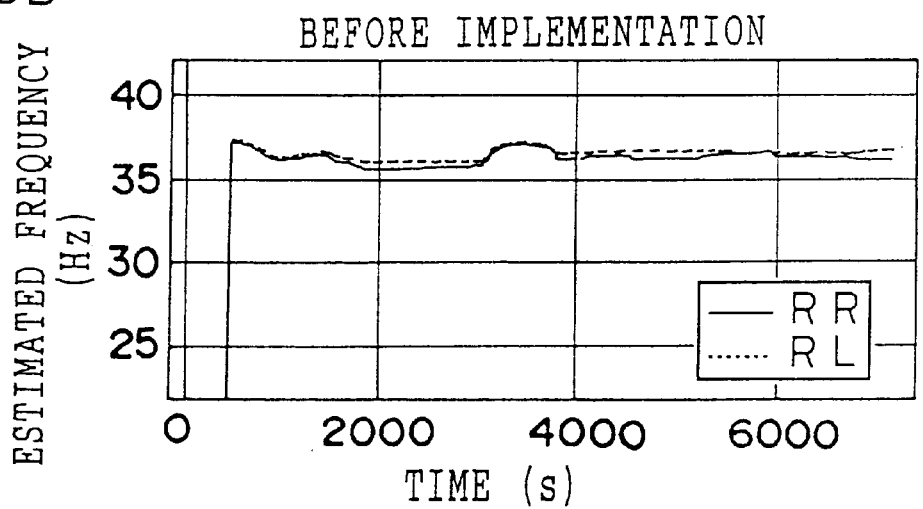
Figure 16C:
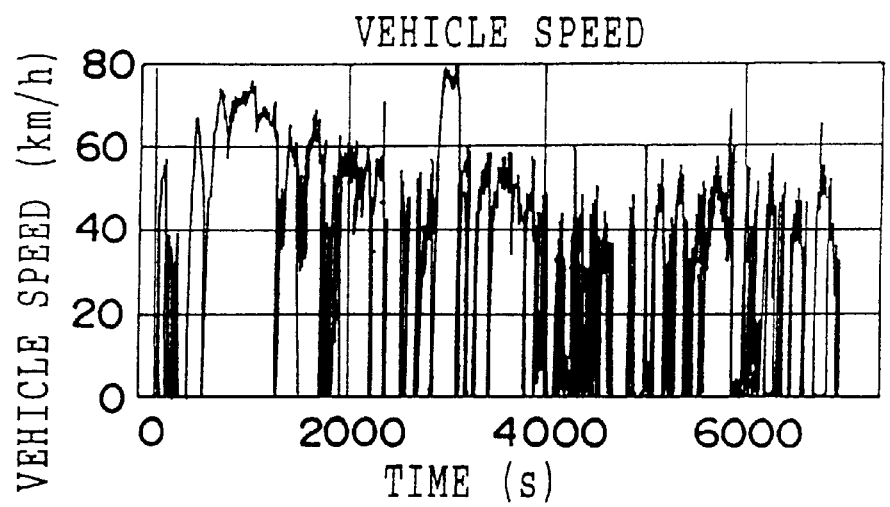

Here, FIGS. 15A through 15C and FIGS. 16A through 16C are graphs showing results in a case in which the frequencies of the left and right wheels are estimated using the method of the present embodiment in two different types of running, and in a case in which the frequencies of the left and right wheels are estimated not using the method of the present invention in two different types of running. FIG. 15C and FIG. 16C show the changes over time in the vehicle speed showing the two types of running. FIG. 15A and FIG. 16A show the frequencies of the left and right wheels estimated using the method of the present embodiment. Note that the solid line represents equation (15) and the dotted line represents equation (16). FIGS. 15B and 16B show the frequencies of the left and right wheels estimated not using the method of the present embodiment. Note that the solid line represents equation (9) and the dotted line represents equation (10). As can be understood from FIGS. 15A through 15C and FIGS. 16A through 16C, variations are suppressed more in frequencies of left and right wheels which are estimated using the method of the present embodiment.

As described above, in the present embodiment, the frequencies of the wheel speed signals of the left and right wheels are corrected using, as the correction value (i.e., as the amount of effect due to the connection of the left and right wheels by mechanical elements), the average value of the difference between, on the one hand, the vibration frequencies of the left and right wheels, and on the other hand, the vibration frequency of the difference between left and right wheel speeds. In this way, the effect due to the left and right wheels being connected by mechanical elements is removed, and the tire air pressure can be estimated from the vibration frequencies of the left and right wheels from which this effect has been removed. In this way, when the air pressure of the tire is estimated, the average value of the difference between the vibration frequencies of the left and right wheels and the vibration frequency of the difference between left and right wheel speeds can be determined. Thus, the computation processing for estimating the tire air pressure can be simplified.

In the present embodiment, in the estimating of the tire air pressure of the drive wheels, the vibration component transferred in the same phase to the left and right wheels from the mechanical elements connecting the left and right wheels is vibration of the drive system. However, in the case of the non-drive wheels as well, the left and right wheels are connected by various mechanical elements. When there is a vibration component which can be transmitted in the same phase to the left and right wheels from these mechanical elements, the present embodiment can also be applied to such non-drive wheels.

When the tire air pressure of drive wheels and non-drive wheels is estimated, the first and second resonance frequency detecting device may have the same structure. As a result, when the tire air pressure is estimated for the drive wheels, the same computation processing as that for the non-drive wheels is carried out, and the program capacity can be reduced.

Here, the method of estimating the frequency at the first resonance frequency estimating device 216R, 216L and the second resonance frequency estimating device 220 will be described. The present frequency estimation method can be carried out similarly to the above-described processings of the reference value setting device 14, the selecting device 16, and the frequency detecting device 18. Namely, the wheel speed signal is corrected such that the amplitude center of the wheel speed signal is the zero reference, the corrected wheel speed signal is amplified, the number of crossings of the amplified wheel speed signal and the zero reference in a predetermined period of time (the number of times the sign changes) is counted, and the frequency is computed on the basis of the count value. Note that the vibration component of the tire may be extracted from the resonance frequency of the tire by using the fast Fourier transform (FFT computation). If the present invention is carried out by using FFT computation, the actual parts and the imaginary parts of the frequency spectrum of each wheel are determined, and the difference between the left and right wheel speeds is computed such that the difference between the actual parts and the difference between the imaginary parts are determined.

In this way, the wheel speed signal may be used as a vector, and the difference in wheel speeds may be computed as a difference in left and right wheel speed vectors.

In a case in which the states of the road surfaces on which the left and right wheels are travelling are markedly different, the estimated vibration frequency of the difference between the vibration components caused by the tire resonance of the left and right wheels may not satisfy equation (11).

In such a case, the difference may be determined by multiplying the vibration components caused by the tire resonance of the left and right wheels by a predetermined coefficient which is correlated to the amplitude (e.g., the ratio of squares of the amplitudes). For example, $$f_{r1} - (v_{l1}/v_{r1})f_{l1} \tag{17}$$

may be determined. Here, $v_{r1}$ and $v_{l1}$ are the averages of the squares of the amplitudes of the wheel speed signals of the left and right wheels.

What is claimed is:

1. A device for detecting a wheel speed signal frequency, comprising:
   a wheel speed detecting device which detects a wheel speed of a wheel including a tire;
   a reference value setting device which sets, as a reference value, an amplitude center of the wheel speed signal outputted from the wheel speed detecting device; and
   a frequency detecting device which detects a frequency of the wheel speed signal on the basis of a number of times that the wheel speed signal crosses the reference value.

2. The device of claim 1, further comprising:
   a computing device which computes a determination value for selecting the wheel speed signal; and
   a selecting device which selects a necessary wheel speed signal on the basis of the determination value.

3. The device of claim 1, wherein the reference value setting device sets the reference value on the basis of an amount of change in the wheel speed signal over a predetermined period of time.

4. The device of claim 1, wherein the reference value setting device includes a signal converting device which converts the wheel speed signal into a wheel speed signal which has an amplitude center equal to a zero reference.

5. The device of claim 1, wherein the reference value setting device includes an amplifying device which amplifies the wheel speed signal.

6. The device of claim 1, further comprising:
   a tire air pressure physical characteristic estimating device which estimates at least one physical characteristic of tire air pressure on the basis of the detected frequency of the wheel speed signal.

7. The device of claim 6, further comprising:
   a passing device which allows passage of a signal of only a predetermined frequency band of the wheel speed signal; and
   a correcting device which corrects the predetermined frequency band of the passing device on the basis of the frequency of the wheel speed signal.

8. The device of claim 7, wherein the correcting device corrects the predetermined frequency band of the passing device such that a center of the predetermined frequency band equals to the frequency of the wheel speed signal.

9. The device of claim 7, wherein the frequency detecting device detects the frequency of the wheel speed signal from an equation $f=C/(2TN)$, where a measured time period of one wheel speed signal is T, a sampled number of wheel speed signals is N, and the number of crossings is C.

10. The device of claim 6, further comprising:
 a computing device which computes a determination value for selecting the wheel speed signal; and
 a selecting device which selects a necessary wheel speed signal on the basis of the determination value.

11. The device of claim 10, wherein the computing device computes, as the determination value, a comparison value between (a) the number of times that the wheel speed signal crosses the reference value and (b) a number of times that a converted wheel speed signal, which has been converted so as to be changed in accordance with changes in the wheel speed signal, crosses the reference value.

12. The device of claim 11, wherein the conversion to obtain the converted wheel speed signal is an nth order difference or an nth order differential, wherein n is a natural number.

13. The device of claim 6, wherein the physical characteristic of tire pressure is a decrease in the tire air pressure.

14. The device of claim 6, wherein the wheel speed detecting device detects a wheel speed signal of each of left and right wheels including a tire and the frequency detecting device detects a vibration frequency of each of the wheel speed signals of the left and right wheels, further comprising:
 a computing device which computes a difference between the wheel speed signals of the left and right wheels; and
 a vibration frequency estimating device which estimates a vibration frequency of the difference between the wheel speed signals of the left and right wheels, further wherein
  the air pressure physical characteristic estimating device estimates at least one physical characteristic of tire air pressure of at least one of the left and right wheels on the basis of each of the vibration frequencies of the wheel speed signals of the left and right wheels detected by the frequency detecting device, and the vibration frequency of the difference between the wheel speed signals of the left and right wheels estimated by the vibration frequency estimating device.

15. The device of claim 14, wherein the wheel speed detecting device detects the wheel speed signal of each of the left and right wheels which are connected by a mechanical element, and the computing device computes the difference between the wheel speed signals of the left and the right wheels from which is removed an effect of vibrations of a same phase caused by the mechanical element which connects the left and right wheels by computing the difference between the wheel speed signals of the left and right wheels.

16. The device of claim 15, wherein the vibration frequency estimating it device estimates an intermediate frequency of frequencies of the wheel speed signals of the left and right wheels from which is removed an effect of vibrations of same phase caused by the mechanical element which connects the left and right wheels by estimating a vibration frequency of the difference between the wheel speed signals of the left and right wheels computed by the computing device.

17. The device of claim 14, wherein the estimating device corrects each of the vibration frequencies of the wheel speed signals of the left and right wheels estimated by the vibration frequency detecting device, by an average value of differences between (a) each of the vibration frequencies of the wheel speed signals of the left and right wheels detected by the vibration frequency detecting device, and (b) the vibration frequency of the difference between the wheel speed signals of the left and right wheels estimated by the vibration frequency estimating device, and on the basis of the corrected vibration frequencies of the wheel speed signals of the left and right wheels, the estimating device estimates at least one physical characteristic of the tire pressure of at least one of the left and right wheels.

18. The device according to claim 14, further comprising:
 a vibration component extracting device for extracting a vibration component of the wheel speed signal of each of the left and right wheels detected by the wheel speed detecting device,
 wherein the vibration frequency detecting device and the computing device use, as the wheel speed signals of the left and right wheels, vibration components of the wheel speed signals of the left and right wheels extracted by the vibration component extracting device.

19. The device according to claim 14, wherein the left and right wheels are both drive wheels or both non-drive wheels.

* * * * *

UNITED STATES PATENT AND TRADEMARK OFFICE
CERTIFICATE OF CORRECTION

PATENT NO. : 6,591,670 B1
DATED : July 15, 2003
INVENTOR(S) : Takaji Umeno et al.

It is certified that error appears in the above-identified patent and that said Letters Patent is hereby corrected as shown below:

Column 24,
Line 11, please change "estimating it device" to -- estimating device --.

Signed and Sealed this

Eighth Day of June, 2004

JON W. DUDAS
*Acting Director of the United States Patent and Trademark Office*